(12) United States Patent
Schultz et al.

(10) Patent No.: US 9,398,467 B2
(45) Date of Patent: Jul. 19, 2016

(54) SYSTEM AND METHOD FOR PROVIDING EXTENSION OF NETWORK COVERAGE

(71) Applicant: Verizon Patent and Licensing Inc., Arlington, VA (US)

(72) Inventors: Paul T. Schultz, Colorado Springs, CO (US); James Ronald Barfield, Jr., Atlanta, GA (US); Todd M. Willis, Woodstock, MD (US); Robert A. Sartini, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 22 days.

(21) Appl. No.: 14/478,654

(22) Filed: Sep. 5, 2014

(65) Prior Publication Data
US 2016/0073271 A1   Mar. 10, 2016

(51) Int. Cl.
*H04W 16/26* (2009.01)
*H04W 12/08* (2009.01)
*H04W 4/22* (2009.01)
*H04W 48/18* (2009.01)
*H04W 64/00* (2009.01)
*H04W 84/18* (2009.01)

(52) U.S. Cl.
CPC ............... *H04W 16/26* (2013.01); *H04W 4/22* (2013.01); *H04W 12/08* (2013.01); *H04W 48/18* (2013.01); *H04W 64/003* (2013.01); *H04W 84/18* (2013.01)

(58) Field of Classification Search
CPC ....... H04W 16/26; H04W 4/22; H04W 12/08; H04W 48/18; H04W 64/003; H04W 84/18
See application file for complete search history.

(56) References Cited

U.S. PATENT DOCUMENTS

| | | | |
|---|---|---|---|
| 2008/0022389 A1* | 1/2008 | Calcev | H04L 63/045 726/14 |
| 2012/0054847 A1* | 3/2012 | Schultz | G06F 21/33 726/9 |
| 2012/0066492 A1* | 3/2012 | Gamer | H04L 45/00 713/156 |
| 2012/0192251 A1* | 7/2012 | Faiman | G06F 21/51 726/3 |

* cited by examiner

*Primary Examiner* — Kashif Siddiqui

(57) ABSTRACT

An approach is provided for causing an extension of secure emergency network resources via one or more trusted point of presence. The approach involves determining a networking context, wherein the networking context initiates a request to join an extension mesh network to a currently trusted network. The approach also involves determining a target network trust level associated with the networking context, the currently trusted network, or a combination thereof. The approach further involves selecting the extension mesh network based on the target network trust level. The approach also involves initiating a joining of the extension mesh network to the currently trusted network.

23 Claims, 34 Drawing Sheets

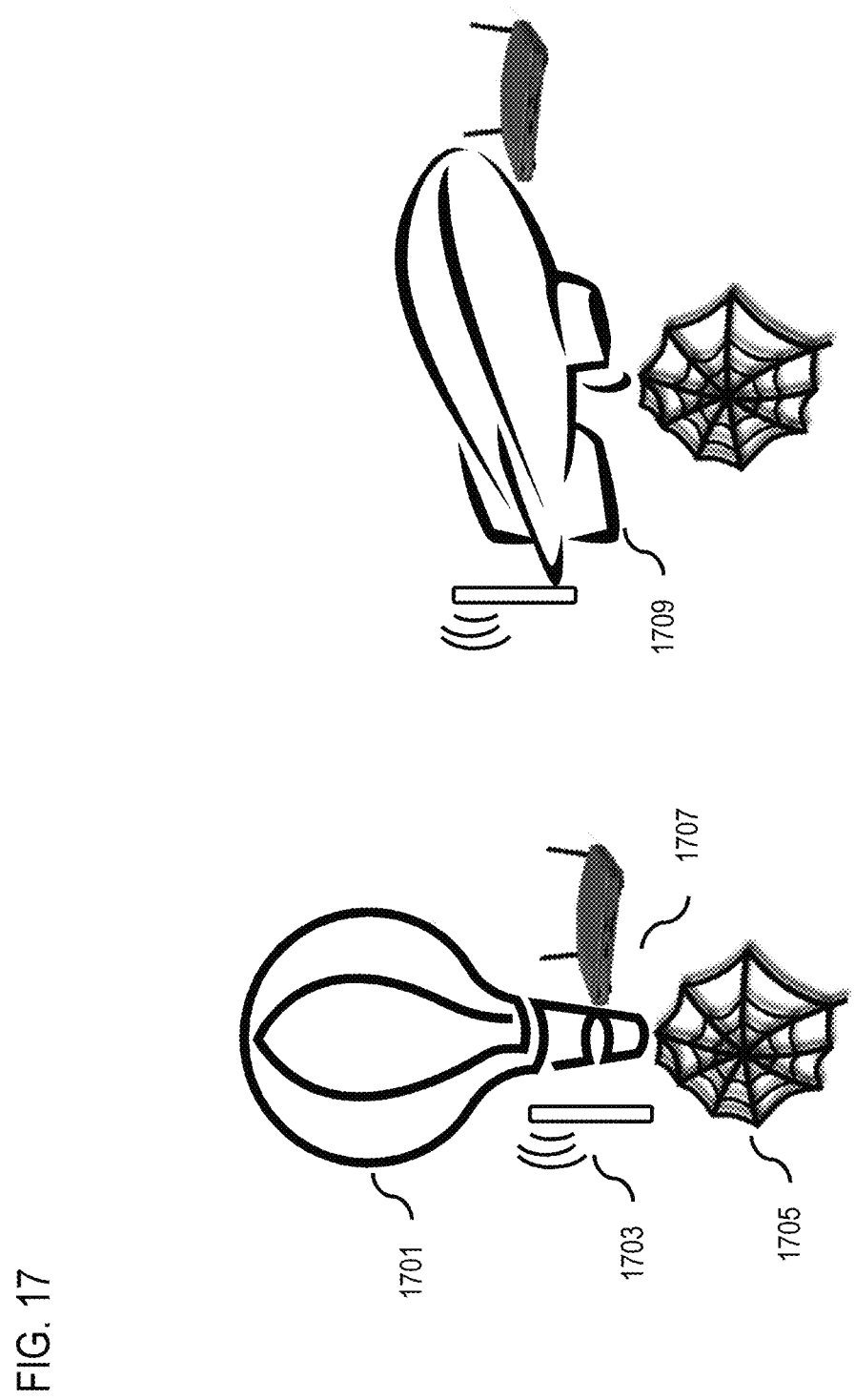

_US 9,398,467 B2_

SYSTEM AND METHOD FOR PROVIDING EXTENSION OF NETWORK COVERAGE

BACKGROUND INFORMATION

Service providers and device manufacturers are continually challenged to provide compelling network services in situation involving natural disasters (e.g., earthquake, tsunami, floods, storms etc.). Generally, mobile vehicles with communication towers (e.g., cell on wheels) are used for provisioning required network resources on a temporary basis. However, natural disasters may make it difficult or impossible to position such vehicles in appropriate locations (e.g., damaged terrains). As a result, there is a need for a mechanism to securely extend network coverage via a mesh networking system with dynamic provisioning of wireless connectivity to locations without network coverage.

Further, the network services provided to mobile users by communication towers may be limited in coverage areas due to lack of height of the antennas and the possibility of obstruction of the network coverage by geographical landforms. Therefore, a mechanism for navigating an airborne vehicle to locations without network coverage for seamless provisioning and transmitting/receiving wireless signals is needed.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 16 B is a diagram that shows a machine learning module processing the real-time aerial vehicle data, according to one example embodiment;

FIG. 17 is a diagram that represents a scenario wherein an aerial vehicle under adverse and/or failure conditions may be retrieved, according to one example embodiment;

DESCRIPTION OF THE PREFERRED EMBODIMENT

Figure 1:
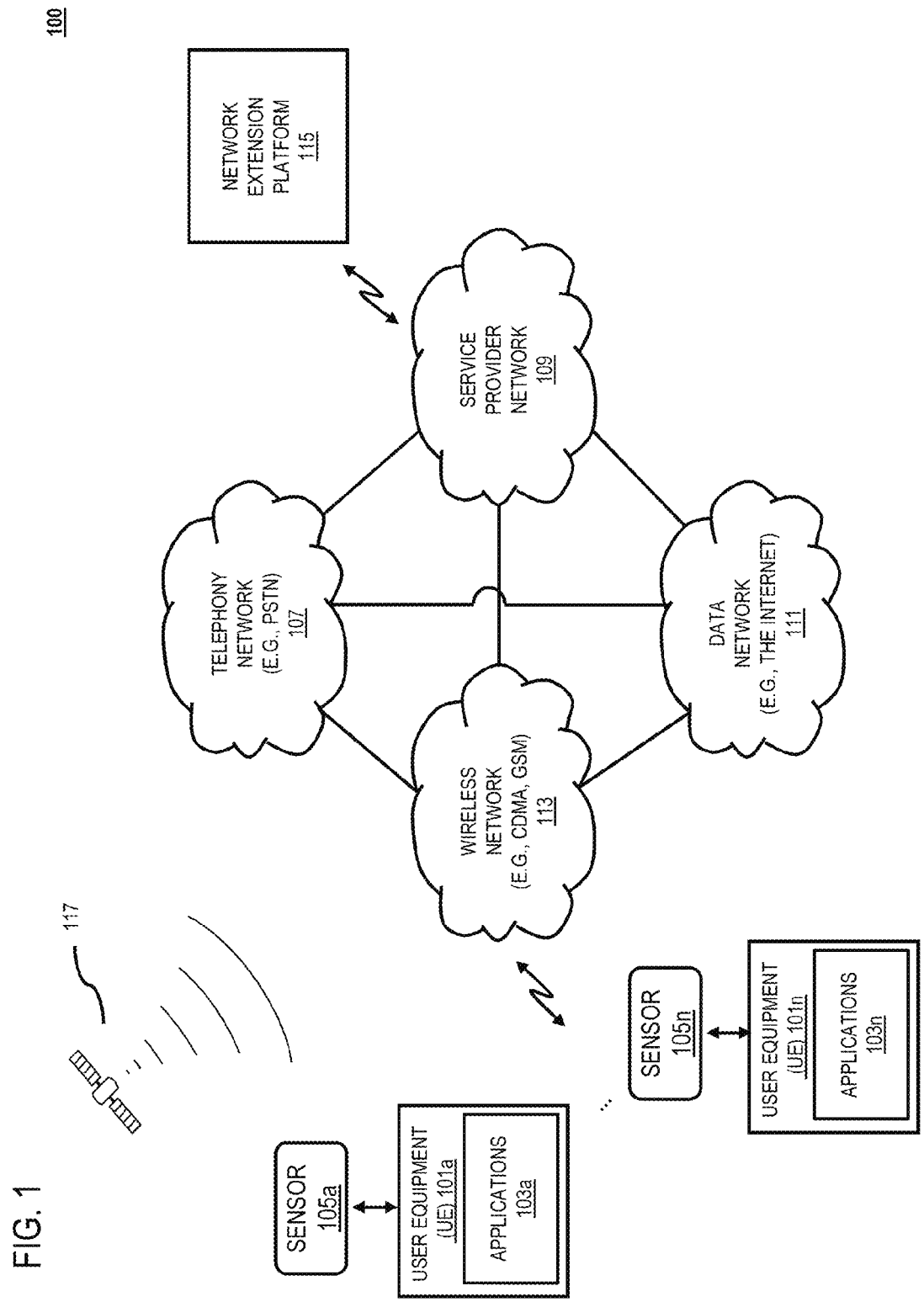
FIG. 1 is a diagram of a system capable of causing an extension of secure emergency network resources via one or more trusted point of presence.

An apparatus, method, and software for causing an extension of secure emergency network resources via one or more trusted point of presence, is described. In the following description, for the purposes of explanation, numerous specific details are set forth in order to provide a thorough understanding of the present invention. As is well known, the present invention may be practiced without these specific details or with an equivalent arrangement. In other instances, well-known structures and devices are shown in block diagram form in order to avoid unnecessarily obscuring the present invention.

Regardless of the developments in telecommunications technology, including the widespread distribution of mobile phones and high speed communications networks, natural disasters continue to disrupt telecommunications systems. In particular, communications infrastructure is more fundamental during emergency situations (e.g., natural disasters) because rescue and relief efforts are usually hampered due to communication failures. As discussed, natural disasters often make it difficult or impossible to place communication towers at the affected locations. Moreover, communication towers may be damaged, resulting in insufficient coverage of the communication signals in the affected area. As a result, there is a need for causing an extension of network resources via one or more trusted point of presence.

In one embodiment, the system 100 facilitates secure extension of network reach during emergency or other events where additional network resources are required. In one example embodiment, a natural disaster (e.g., hurricane, wildfire or earthquake) may adversely impact the trusted commercial networks due to factors including damage and network congestion. The system 100 specifies one or more mechanisms for securely extending network coverage via mesh networking with robust security, management and control of the mesh network extension. On the other hand, the system 100 may dynamically provide wireless connectivity to one or more locations where it is needed the most. For example, a disaster struck area may require additional communications capabilities. Therefore, the system 100 may dynamically allocate, deploy and manage elastic communications that includes UAVs. The system 100 may provide network services to the subscribers by dynamically configuring/re-configuring aerial ad-hoc network(s) in response to subscriber location and service usage.

In one embodiment, the system 100 may process the networking context of a secure emergency network resource to determine joining of an extension mesh network. Then, the system 100 may process the trust level of one or more peer nodes, the connection between the nodes, or a combination thereof to calculate an extension network trust score for one or more network relationships. Subsequently, the system 100 may cause an extension of a secure emergency network resource via one or more trusted point of presence. In one scenario, the system 100 may securely extend trusted network communications services to appropriate mesh networks and nodes. In another scenario, the system 100 may enforce security, management and control of mesh networks extended from one or more trusted networks.

In one embodiment, the system 100 may determine that a secure emergency network resource requires additional network resources. Then, the system 100 may cause a vehicle (e.g., an airborne vehicle, a terrestrial vehicle) to navigate towards the location of a secure emergency network resource with additional aerial network resources, terrestrial network resources, or a combination thereof. Subsequently, the system 100 causes a peer-to-peer communication, a mesh network communications, or a combination thereof via heterogeneous network, terrestrial transmission mechanisms, or a combination thereof. In one scenario, the system 100 causes a hierarchical management and control of dynamic distributed aerial networking resources to dynamically provide network services in diverse geographies without supporting utilities (e.g., electrical power).

In one embodiment, the system 100 causes dynamic configuration of aerial network resources based on subscriber location and subscriber's network service usage. In a further scenario, the system 100 may seamlessly handover networking services from one networking resource (e.g., drone, cell tower) to another without the user losing network service. In one example embodiment, in an area without network coverage, the system 100 may utilize an aerial vehicle capable of distributing network signals. The aerial vehicle may be controlled by the system 100 (e.g., stabilizing the aerial vehicle) to optimize the network resources and the coverage area. In one scenario, the aerial vehicle may include balloons, airships, UAVs, blimps, drones, a vehicle etc., capable of expanding or enhancing network coverage.

The system 100 may manage the distribution of network resources, for example, by moving an aerial vehicle from one point of interest to another (e.g., from a location where network coverage is no longer scarce, to another location where network coverage is scarce). In one embodiment, the system 100 may include a charging station for one or more aerial so vehicles can be charged while in the air.

As shown in FIG. 1, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to the network extension platform 115 via networks 107-113. In one embodiment, the network extension platform 115 performs one or more functions associated with causing an extension of secure emergency network resources via one or more trusted point of presence.

By way of example, the UE 101 is any type of mobile terminal, fixed terminal, or portable terminal including a mobile handset, station, unit, device, multimedia computer, multimedia tablet, wearable computer, internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.). In one embodiment, the one or more vehicles may have cellular or Wi-Fi connection either through the inbuilt communication equipment or from the UE 101 associated with the vehicles. In one scenario, one or more vehicles may include airborne vehicles (UAV, blimps, drones), terrestrial vehicles (e.g. motorcycles, buses, bikes, etc.).

By way of example, the applications 103 may be any type of application that may perform various processes and/or functions at the UE 101. In one embodiment, the applications 103 may be context determining applications (e.g., emergency situation), content provisioning applications, location-based service applications, environmental conditions determination applications, mapping applications, GIS applications, search and rescue applications, sensor monitoring applications, calendar applications, network trust determining applications, and the like. In one embodiment, one of the applications 103 at the UE 101 may act as a client for the network extension platform 115 and may perform one or more functions associated with the functions of the network extension platform 115 by interacting with the network extension platform 115 over the network 107-113.

By way of example, the sensors 105 may be any type of sensor. In certain embodiments, the sensors 105 may include, for example, a network detection sensor for detecting wireless signals or receivers for different short-range communications (e.g., Bluetooth, Wi-Fi, Li-Fi, LTE, near field communication etc.), a global positioning sensor for gathering location data (e.g., GPS), and the like. In another embodiment, the sensors 105 may include cell sector, cell triangulation, progressive triangulation utilizing UAVs, environment network location indicators (e.g., location beacons, known Wi-Fi hotspots). In one scenario, the sensors 105 may include, light sensors, orientation sensors augmented with height sensing and acceleration sensing, tilt sensors to detect the degree of incline or decline of the vehicle along a path of travel, moisture sensors, pressure sensors, etc. In one example embodiment, the UE 101 and/or vehicles may include GPS receivers to obtain geographic coordinates from satellites 117 for determining current location and time associated with the UE 101 and/or the vehicle. In another example embodiment, UAVs with network sensing may perform progressive triangulation in order to determine precise location of UE 101 in emergency, environmental hazard and/or search and rescue situations. In yet another example embodiment, the sensors 105 may detect weather data etc.

For illustrative purposes, the networks 107-113 may be any suitable wireline and/or wireless network, and be managed by one or more service providers. For example, telephony network 107 may include a circuit-switched network, such as the public switched telephone network (PSTN), an integrated services digital network (ISDN), a private branch exchange (PBX), or other like network. Wireless network 113 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (Wi-Fi), satellite, and the like. Meanwhile, data network 111 may be any local area network (LAN), metropolitan area network (MAN), wide area network (WAN), the Internet, or any other suitable network, such as a commercially owned, proprietary network, such as a proprietary cable or fiber-optic network.

Although depicted as separate entities, networks 107-113 may be completely or partially contained within one another, or may embody one or more of the aforementioned infrastructures. For instance, the service provider network 109 may embody circuit-switched and/or packet-switched networks that include facilities to provide for transport of circuit-switched and/or packet-based communications. It is further contemplated that networks 107-113 may include components and facilities to provide for signaling and/or bearer communications between the various components or facilities of system 100. In this manner, networks 107-113 may embody or include portions of a signaling system 7 (SS7) network, Internet protocol multimedia subsystem (IMS), or other suitable infrastructure to support control and signaling functions.

In one embodiment, the network extension platform 115 may be a platform with multiple interconnected components. The network extension platform 115 may include multiple servers, intelligent networking devices, sensors, computing devices, components and corresponding software for causing an extension of secure emergency network resources via one or more trusted point of presence, is described. In addition, it is noted that the network extension platform 115 may be a separate entity of the system 100, or included within the UE 101 (e.g., as part of the applications 103).

In one embodiment, the network extension platform 115 may determine a networking context, wherein the networking context initiates a request to join an extension mesh network to a currently trusted network. In one example embodiment, the network extension platform 115 may be able to detect network coverage status. For example, the network extension platform 115 may determine network coverage failure in certain areas (e.g., an emergency area, a high network traffic area, or any other area where network coverage is scarce or not available).

In one embodiment, the network extension platform 115 may determine a target network trust level associated with the networking context, the currently trusted network, or a combination thereof. In another embodiment, the network extension platform 115 may generate confidence scores for one or more extension mesh networks. In one scenario, the network extension platform 115 may determine a trust score for extension mesh networks and/or nodes. Then, the network extension platform 115 may classify and tag extension mesh networks and/or nodes. Tagging allows easy identification of the extension mesh networks and/or nodes, whilst classification allows for ranking of the extension mesh networks and/or nodes based on their trust scores.

In a further embodiment, the network extension platform 115 may select the extension mesh network based on the target network trust level. In one embodiment, the network extension platform 115 may sense an extension mesh network and nodes of the extension mesh network. Then, the network extension platform 115 may determine their trust levels, and cause a classification. Subsequently, the network extension platform 115 may select an extension mesh network, nodes of the extension mesh network, for spreading the network coverage. In one scenario, after trust score determination, classification and/or tagging, the network extension platform 115 may select the most suitable extension mesh network based, at least in part, on the type of communication. The network extension platform 115 may allow non-confidential and/or less important information to be communicated via a less trustworthy network connection, where as a highly confidential and important information may only be disseminated through a secured network connection.

In another embodiment, the network extension platform 115 may initiate a joining of the extension mesh network to the currently trusted network. In one scenario, the network extension platform 115 may initiate extension of network coverage, wherein a selected extended mesh network and/or an aerial vehicle may be the connection point for disseminating a communication. Then, another connection point may be a node of the extension mesh network or a drone equipped with network resources.

According to exemplary embodiments, end user devices may be utilized to communicate over system 100 and may include any customer premise equipment (CPE) capable of sending and/or receiving information over one or more of networks 107-113. For instance, a voice terminal may be any suitable plain old telephone service (POTS) device, facsimile machine, etc., whereas mobile device (or terminal) may be any cellular phone, radiophone, satellite phone, smart phone, wireless phone, or any other suitable mobile device, such as a personal digital assistant (PDA), pocket personal computer, wearable computer, tablet, customized hardware, etc. Further, computing device may be any suitable computing device, such as a VoIP phone, skinny client control protocol (SCCP) phone, session initiation protocol (SIP) phone, IP phone, personal computer, softphone, workstation, terminal, server, etc.

Figure 2:
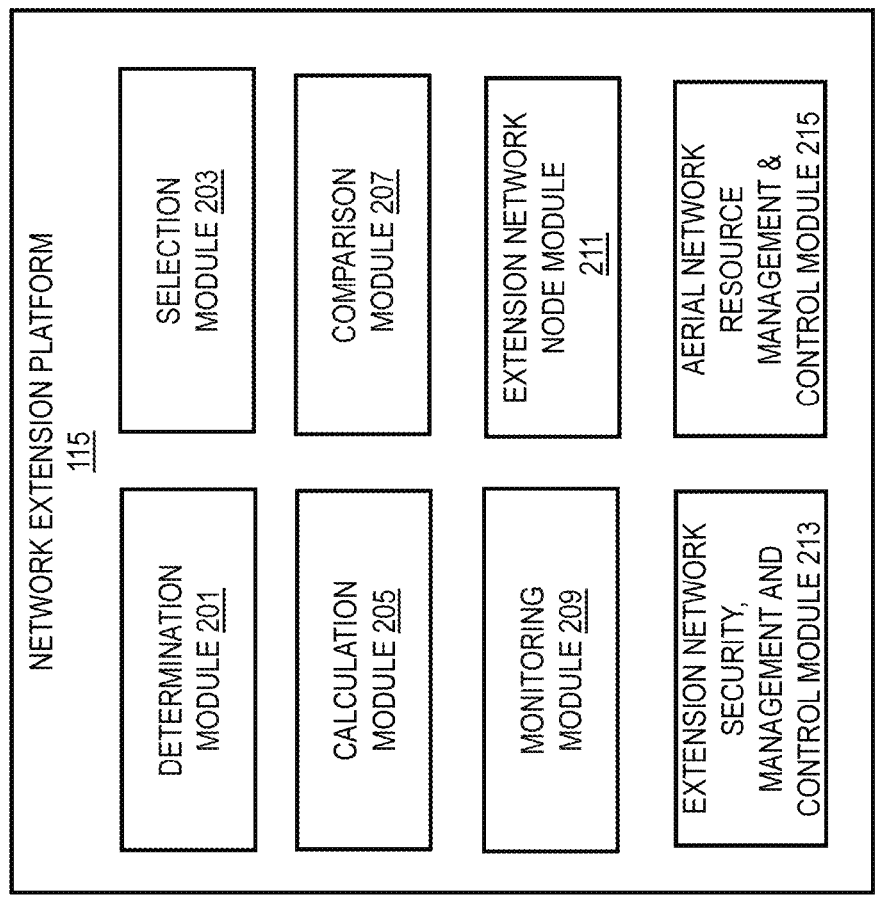
FIG. 2 is a diagram of the components of the network extension platform 115, according to one embodiment.

FIG. 2 is a diagram of the components of the network extension platform 115, according to one embodiment. By way of example, the network extension platform 115 includes one or more components for causing an extension of secure emergency network resources via one or more trusted point of presence. It is contemplated that the functions of these components may be combined in one or more components or performed by other components of equivalent functionality. In this embodiment, the network extension platform 115 includes a determination module 201, a selection module 203, a calculation module 205, a comparison module 207, a monitoring module 209, an extension network node module 211, an extension network security, management and control module 213, and aerial network resource management and control module 215.

In one embodiment, the determination module 201 may process the networking context of a secure emergency network resource to determine joining of an extension mesh network. In another embodiment, the determination module 201 may cause a transfer of information to at least one node in transitive trust tokens format. Then, the determination module 201 may determine at least one node as a token trust authority to perform network extension trust factor calculation. In a further embodiment, the determination module 201 may determine that a secure emergency network requires additional network resources. Then, the determination module 201 may cause an airborne vehicle, a vehicle, or a combination thereof to navigate towards the location of a secure emergency network resource with the additional aerial network resources, terrestrial network resources, or a combination thereof.

In one embodiment, the selection module 203 may select a new communication path between one or more nodes for a trusted network extension based, at least in part, on hop trust score, communication trust score, or a combination thereof. In another embodiment, the selection module 203 may select the extension mesh network based on the target network trust level. In one scenario, the selecting of the extension mesh network is based on a comparison of trust level score against the target network trust level.

In one embodiment, the calculation module 205 may calculate a trust level score for the extension mesh network, one or more nodes of the extension mesh network, one or more links between the one or more nodes, or a combination thereof based on one or more network trust factors. In one scenario, a trust level score is based, at least in part, on the number of network hops from the trusted point of presence, the physical location of the nodes, the network types, the number of peer connections, the identified networks and nodes, the communication history, or a combination thereof. In another embodiment, the calculation module 205 may calculate a communication path trust level for the communication path based on the trust level score, the trust token, or a combination thereof associated with the at least one of the one or more nodes. In one scenario, the trust score of a communication path between one or more nodes is determined by the lowest trust score of the hops made to establish an end-to-end path.

In one embodiment, the comparison module 207 may cause a comparison between the network trust level and the minimum trust threshold level. Then, the comparison module 207 may cause an updating of the network trust score, context of the network, or a combination thereof.

In one embodiment, the monitoring module 209 may monitor the extension mesh network for a change to a network topology, the one or more nodes, the one or more links, or a combination thereof. Then, the monitoring module 209 may update the trust level score based on the change. In another embodiment, the monitoring module 209 may monitor historical location information to provide additional network resources, estimate future network demands, or a combination thereof. In a further embodiment, the monitoring module 209 may process historical usage information to estimate usage demands.

In one embodiment, the extension network node module 211 may perform high-level functionality within a UE 101 to protect a user from adverse conditions (e.g., excessive processing power use of their device, participation in undesirable communications like sending spam or viruses, etc.) and control their participation in extension networks. The components of the extension network node module 211 are defined in detail in FIG. 3.

In one embodiment, the extension network security, management and control module 213 may cause an extension of secure emergency network resources via one or more trusted point of presence. The components of the extension network security, management and control module 213 are defined in detail in FIG. 4.

In one embodiment, the aerial network resource management and control module 215 may leverage wireless communication using an aerial vehicle. The components of the aerial network resource management and control module 215 are defined in detail in FIG. 5.

The above presented modules and components of the network extension platform 115 can be implemented in hardware, firmware, software, or a combination thereof. Though depicted as a separate entity in FIG. 1, it is contemplated that the network extension platform 115 may be implemented for direct operation by respective UE 101. As such, the network extension platform 115 may generate direct signal inputs by way of the operating system of the UE 101 for interacting with the applications 103. In another embodiment, one or more of the modules 201-215 may be implemented for operation by respective UEs, as a network extension platform 115. Still further, the network extension platform 115 may be integrated for direct operation with network services provided by networks 107-113, such as in the form of a widget or applet, in accordance with an information and/or subscriber sharing arrangement. The various executions presented herein contemplate any and all arrangements and models.

Figure 3:
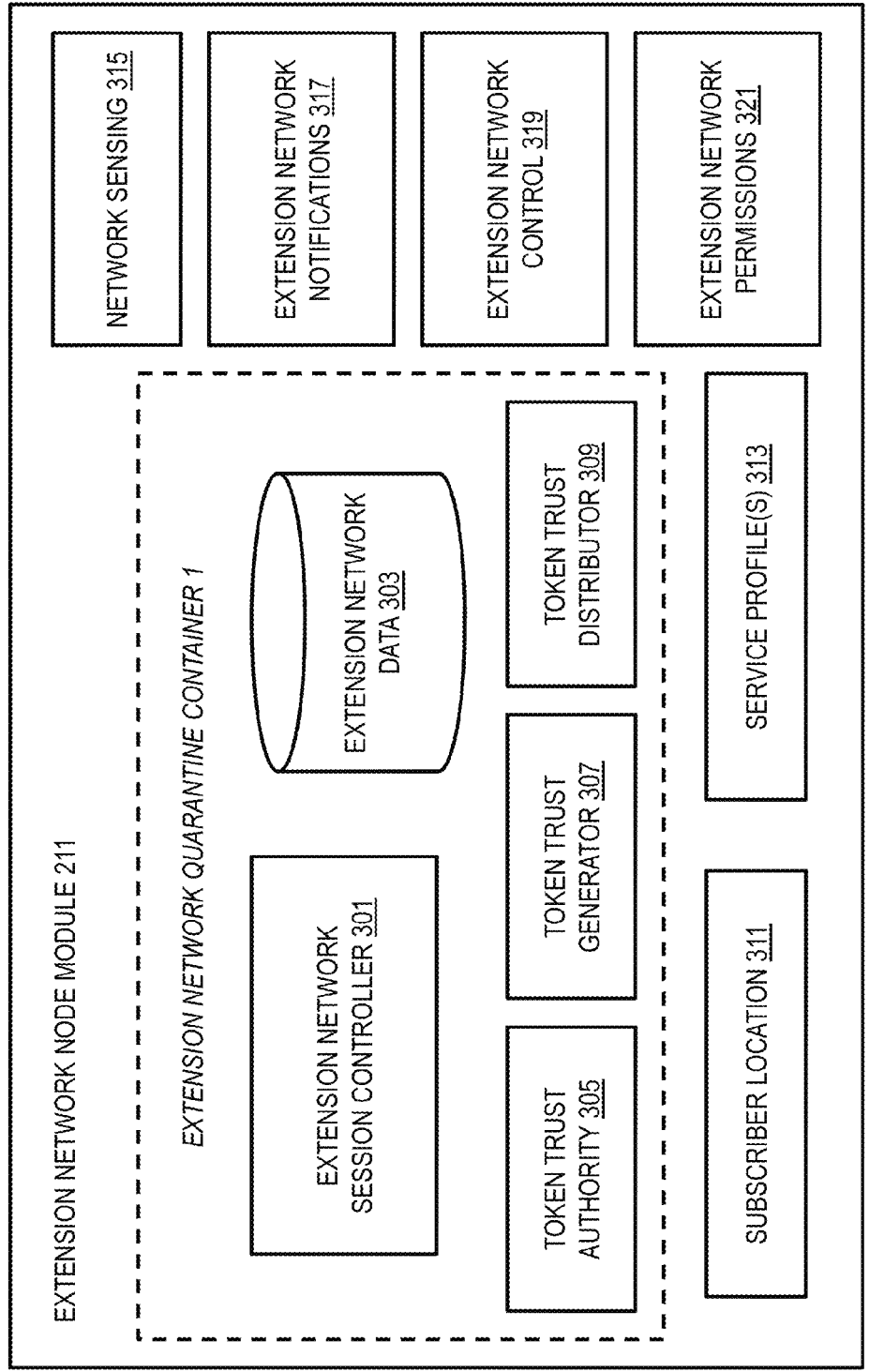
FIG. 3 is a diagram of the components of the extension network node module 211 that performs high-level of functionality within a UE 101 to protect a user from adverse conditions and control their participation, according to one embodiment.

FIG. 3 is a diagram of the components of the extension network node module 211 that performs high-level of functionality within a UE 101 to protect a user from adverse conditions and control their participation, according to one embodiment. In one scenario, a user in an extension network may need protection from adverse conditions (e.g., excessive processing power use of their device, participation in undesirable communications like sending spam or viruses, etc.). Further, a user may require control over his participation in extension networks. By way of example, the extension network node module 211 includes extension network session controller 301, extension network data 303, trust token authority 305, trust token generator 307, trust token distributor 309, subscriber location 311, service profile 313, network sensing 315, extension network notifications 317, extension network control 319, and extension network permissions 321.

In one embodiment, the extension network session controller 301 manages the communication sessions across various nodes. The extension network session controller 301 may classify one or more communication sessions as "Trusted", "Untrusted" or "Unverified". In one scenario, the extension network session controller 301 may determine the classification of a communication session based, at least in part, on the contextual information (e.g., location, emergency events occurring, etc.), the communication history, the network fingerprint, the device fingerprint, the number of network hops, the network type(s), the number of peer connections, the network trust of each network hops, or a combination thereof. Further, to include a non-limiting aspect, the extension network session controller 301 may classify one or more communication sessions by using a machine-learning approach similar to the ones outlined herein for the classification of communication sessions based on the contextual information described.

In one embodiment, the extension network data 303 may store communication history, network service history, network service plan, or a combination thereof for one or more UE 101. In another embodiment, the extension network data 303 may store data related to one or more service profiles to support a mesh network when connected to an unknown commercial trusted network.

In one embodiment, the trust token authority 305 may extend a trusted network by calculating, transferring and updating the transitive trust tokens. In another embodiment, the token trust authority 305 may determine the highest trust node in a network connection relationship, for example, in a network extension the trust token authority 305 is the trusted point of presence (PoP). Then, the trusted PoP utilizes network extension trust factors to calculate trust levels for various nodes and their network connections. The trusted PoP securely transfers information between various nodes in the form of a securely transferred transitive trust token.

In one embodiment, the token trust generator 307 may generate confidence scores for one or more network trusts, one or more devices, one or more node trusts, or a combination thereof. In another embodiment, the token trust generator 307 may generate confidence scores for emergency mesh networking services.

In one embodiment, the token trust distributor 309 may extend and distribute the trusted network authentication and authorization beyond directly connected trusted network nodes. In another embodiment, the token trust distributor 309 may create and distribute transitive trust tokens for distributed trust evaluation via transitive trust authority mechanisms.

In one embodiment, the subscriber location 311 may determine physical location of the node (location may be obtained via GPS, cell sector, cell triangulation, progressive triangulation utilizing UAVs, environmental network location indications (e.g., location beacons, known Wi-Fi hotspots), etc.). In another embodiment, the subscriber location 311 may determine a context (e.g., user location) to allow a user device to participate in an extension network. The user may choose to allow participation in an extension network of a certain trust level (e.g., at least "medium" trust) and/or for a specified type of network traffic or service (e.g., emergency communications only). In yet another example embodiment, UAVs with network sensing may perform progressive triangulation in order to determine precise location of UE 101 in emergency, environmental hazard and/or search and rescue situations. In a further embodiment, the subscriber location 311 may utilize user's context including physical location for extending trusted networks.

In one embodiment, the service profiles 313 may access service profiles for one or more UE 101s from the extension network data 303 for extending the trusted networks (e.g., supporting a mesh network when connected to unknown trusted networks).

In one embodiment, the network sensing 315 may sense one or more networks to cause a classification of the networks based, at least in part, on trust factors. In another embodiment, the network sensing 315 may tag one or more network with the trust scores, based, at least in part, on the classification.

In one embodiment, the extension network notification 317 may provide interactive smart notifications to users to participate in the mesh networking. In one scenario, users may interact with interactive smart notifications to determine the context for participating in the extension mesh network, the security and/or the privacy of the extension network, the peer participants in the extension network, the network types for extension network, etc.

In one embodiment, the extension network control 319 may enforce security, management and control of mesh networks extended from one or more trusted network. In one scenario, the extension network control 319 may provide participants control over how they participate in extension networks, for example, participants need protection from adverse conditions (e.g., excessive processing power use of their device, participation in undesirable communications like sending spam or viruses, etc.). In another embodiment, the extension network control 319 provides the users with the facility to retrieve extension mesh networking status and control their potential participation in mesh networking.

In one embodiment, the extension network permissions 321 may communicate with the other components of the extension network node module 211 to permit secure transfer of information between various trusted nodes.

Figure 4:
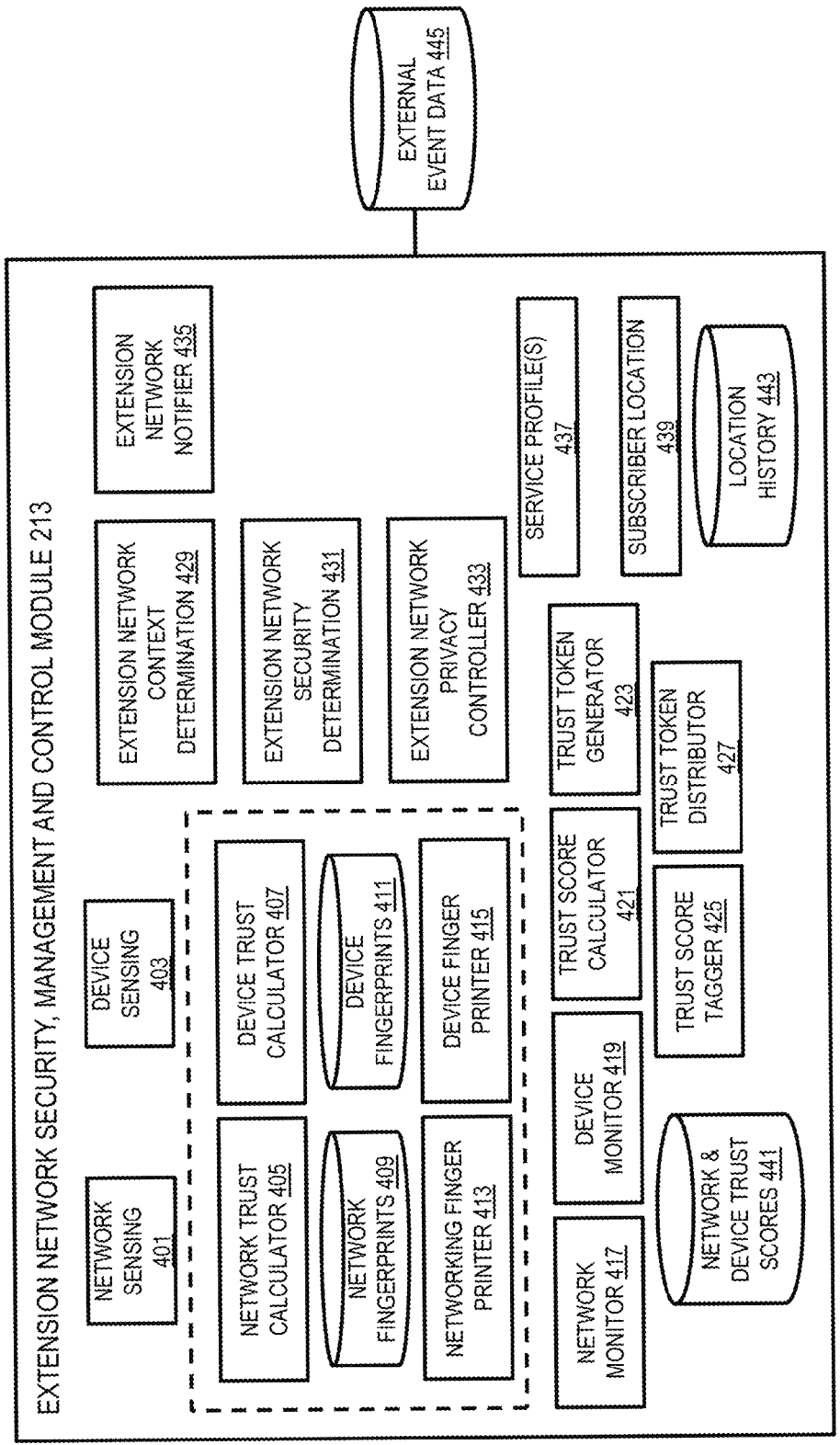
FIG. 4 is a diagram of the components of the extension network security, management and control module 213 that performs high-level functionality in the network cloud, with minimal processing occurring on the UE 101 for causing an extension of secure emergency network resources via one or more trusted point of presence, according to one embodiment.

FIG. 4 is a diagram of the components of the extension network security, management and control module 213 that performs high-level of functionality in the network cloud, with minimal processing occurring on the UE 101 for causing an extension of secure emergency network resources via one or more trusted point of presence, according to one embodiment. By way of example, extension network security, management and control module 213 includes network sensing 401, device sensing 403, network trust calculator 405, device trust calculator 407, network fingerprints 409, device fingerprints 411, networking finger printer 413, device finger printer 415, network monitor 417, device monitor 419, trust score calculator 421, trust token generator 423, trust score tagger 425, trust token distributor 427, extension network context determination 429, extension network security determination 431, extension network privacy controller 433, extension network notifier 435, service profile 437, subscriber location 439, network and device trust scores 441, location history 443, external event data 445.

In one embodiment, the network sensing 401 may sense one or more networks to cause a classification of the networks based, at least in part, on trust factors. Then, the network sensing 401 may tag one or more networks with the trust scores, based, at least in part, on the classification. Network sensing 401 may work cooperatively with network sensing 315 that may execute on one or more UE 101s. In another embodiment, the device sensing 403 may sense one or more devices to cause a classification of the one or more devices based, at least in part, on trust factors. Then, the device sensing 403 may tag one or more devices with the trust scores, based, at least in part, on the classification.

In one embodiment, the network trust calculator 405 may calculate an extension network trust score for every network relationship within an extended network. The network trust calculator 405 may use the trust level of the peer nodes, the trust level of the connection between the nodes, or a combination thereof to calculate the trust scores. In another embodiment, the device trust calculator 407 may calculate trust level for one or more devices, the network connection to one or more devices, or a combination thereof. Then, the device trust calculator 407 may transfer the determined information to cause network extension.

In one embodiment, a networking finger printer 413 and a device finger printer 415 may uniquely identify original data associated with one or more networks, one or more devices, or a combination thereof. In one embodiment, the network fingerprints 409 and the device fingerprints 411 may store data associated with one or more networks, one or more devices, or a combination thereof. The network fingerprints 409 and the device fingerprints 411 may offer a consistent, standard interface to such identifiable feature for usage by the networking finger printer 413 and the device finger printer 415. In one scenario, a network trust may be verified based, at least in part, on the network fingerprint, the device fingerprint, or a combination thereof.

In one embodiment, the network monitor 417 may monitor a communication network for problems (e.g., slow or failing network services), and may notify the extension network security, management and control module 213 upon detecting any problems. In another embodiment, the device monitor 419 may monitor one or more UE 101s running on different operating systems with a multitude of functions for problems (e.g., low battery level etc.). Then, the device monitor 419 may notify the extension network security, management and control module 213 upon detecting any problems.

In one embodiment, the trust score calculator 421 may utilize network extension trust factors to calculate trust levels for one or more networks, one or more devices/nodes, one or more emergency mesh networks, or a combination thereof. In one scenario, the trust level of the peer node, the trust level of the connection between the nodes, or a combination thereof are used to calculate an extension network trust score for every network relationship within an extended network. In another scenario, the trust score calculator 421 may recommend that a communication cannot occur because the trust score for an extension network is too low and/or may downgrade trust scores for the communication path.

In one embodiment, the token trust generator 423 may generate confidence scores for one or more network trusts, one or more devices, one or more node trusts, or a combination thereof. In another embodiment, the token trust generator 423 may generate confidence scores for emergency mesh networking services. Token trust generator 423 may work cooperatively with token trust generator 307 that may execute on one or more UE 101s. In another embodiment, the confidence scores are generated by a machine-learning approach using one or more network trusts, one or more devices, one or more node trusts, or a combination thereof.

In one embodiment, the trust score tagger 425 may tag a requested communication with a communication trust score (CTS). In another embodiment, the trust score tagger 425 may tag one or more networks, one or more nodes, one or more devices, or a combination thereof with trust scores.

In one embodiment, the trust token distributor 427 may extend and distribute trusted network authentication and authorization beyond directly connected trusted network nodes. In another embodiment, the trust token distributor 427 may create and distribute transitive trust tokens for distributed trust evaluation via transitive trust authority methods. Trust token distributor 427 may work cooperatively with trust token distributor 309 that may execute on one or more UE 101s.

In one embodiment, the extension network context determination 429 may determine the context of a user (e.g., user location), for example, a user may allow their device to participate in an extension network if their location is affected by a natural disaster. In another embodiment, the extension network context determination 429 may determine the networking context, for example, an emergency warrants the consideration of joining an extension mesh network. If the context warrants extension mesh network participation, required trust levels for candidate networks are subsequently determined.

In one embodiment, the extension network security determination 431 may determine security of extension network, for example, whether a communication session is "Trusted", "Untrusted" or "Unverified". In one scenario, the determination that a communication session is trusted may be based, at least in part, on the contextual information (e.g., location, emergency events occurring, etc.), the communication history, the network fingerprint, the device fingerprint, the number of network hops, the network type(s), the number of peer connections, the network trust of each network hop, or a combination thereof. In another scenario, the extension network security determination 431 may securely extend network coverage via mesh networking with robust security, management and control of the mesh network extension.

In one embodiment, the extension network privacy controller 433 may provide privacy solutions for mesh networks and ensures privacy of the communication between the extension networks. In another embodiment, the extension network privacy controller 433 may determine that the privacy associated with a user of UE 101 warrants the consideration of joining an extension mesh network, for example, during an emergency.

In one embodiment, the extension network notifier 435 may provide interactive smart notifications to users to participate in the mesh networking. In one scenario, users may interact with interactive smart notifications to determine the context for participating in the extension mesh network, the security and/or the privacy of the extension network, the peer participants in the extension network, the network types for extension network, etc.

In one embodiment, the service profiles 437 may utilize the service profile of one or more UE 101s for extending the trusted networks, for example, supporting a mesh network when connected to unknown trusted networks.

In one embodiment, the subscriber location 439 may determine physical location of the node (location may be obtained via GPS, cell sector, cell triangulation, progressive triangulation utilizing UAVs, environmental network location indications (e.g., location beacons, known Wi-Fi hotspots), etc.). In another embodiment, the subscriber location 439 may determine a context (e.g., user location) to allow a user device to participate in an extension network. The user may choose to allow participation in an extension network of a certain trust level (e.g., at least "medium" trust) and/or for a specified type of network traffic or service (e.g., emergency communications only). In a further embodiment, the subscriber location 439 may utilize user's context including physical location for extending trusted networks.

In one embodiment, the network and device trust scores 441 may store the trust scores associated with one or more networks, one or more devices, or a combination thereof. The other components of the extension network security, management and control module 213 may access the information stored in the network and device trust scores 441 to classify the communications sessions as "Trusted", or "Untrusted". In one embodiment, the classifications of the communications sessions are generated by using a machine-learning approach such as an unsupervised machine learning (e.g. neural networks, regression classification, support vector machines, etc.) method created using information stored in the network. In one embodiment, the network and device trust scores 441 may store user information, vehicle information, network information etc. In one scenario, user information may include name, address, and phone number associated with the user, user history, trust scores and the like. In another scenario, user information may further include subscription information to a network extension program, user authorization information (e.g., user identification (ID) and a password, user biometrics, etc.). On the other hand, vehicle information may include location information, capacity information, vehicle capabilities information, vehicle configuration information, vehicle sensor information, vehicle stabilization information, etc. The one or more UE 101 and/or vehicle may collect data from the environment (e.g., wind strength information, sunlight information, air humidity information, etc.) and may transmit this data to the network extension platform 115 and the network and device trust scores 441.

In one embodiment, the location history 443 may store location information for one or more UE 101s. In another embodiment, the location history 443 may store location information for one or more network resources (e.g., aerial network resources, terrestrial network resources, etc.). In yet another embodiment, the external event data 445 may store information on external events, for example, weather information, emergency broadcasts etc.

Figure 5:
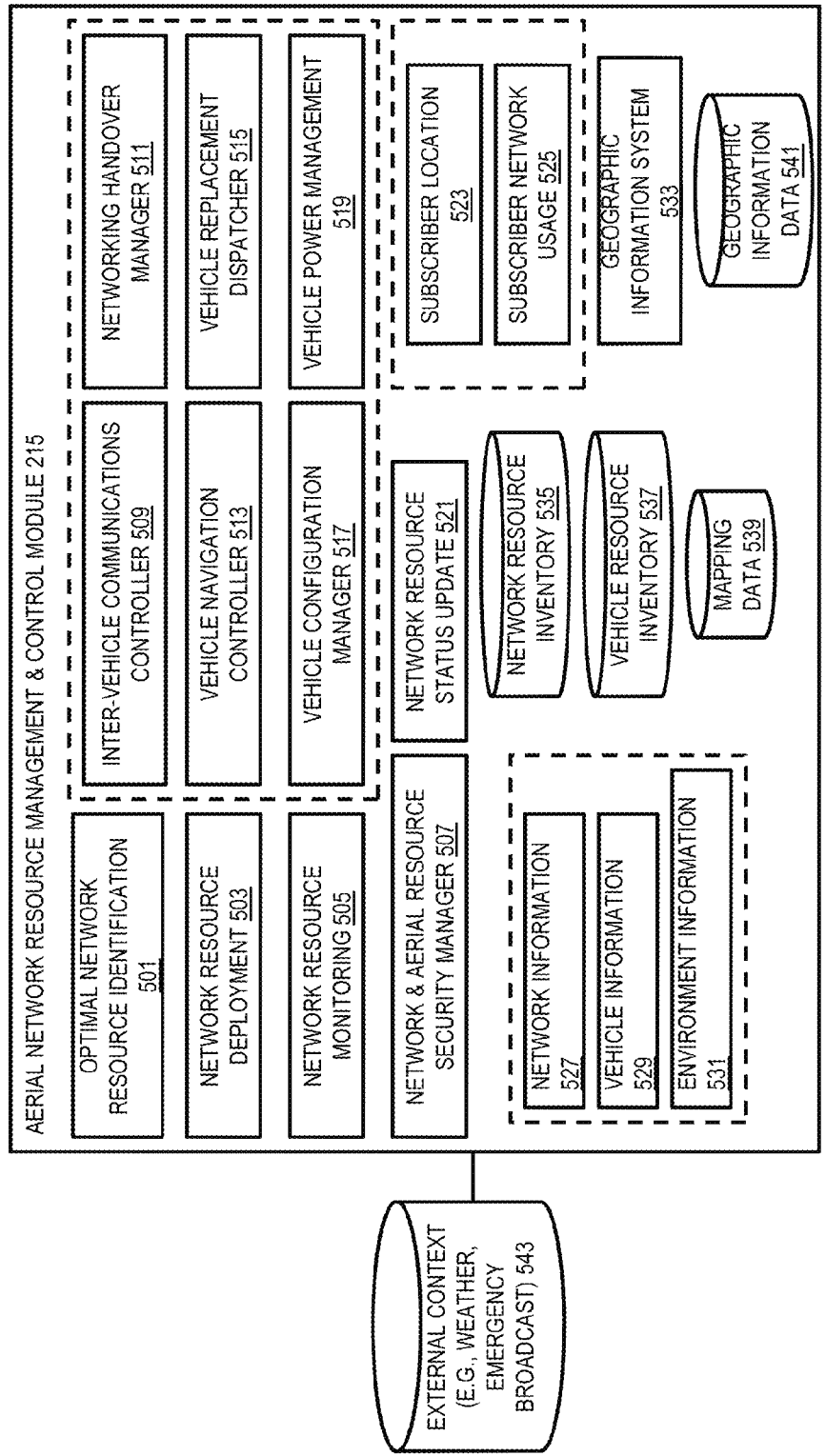
FIG. 5 is a diagram of the components of the aerial network resource management and control module 215 for leveraging wireless communication using an aerial vehicle, according to one embodiment.

FIG. 5 is a diagram of the components of the aerial network resource management and control module 215 for leveraging wireless communication using an aerial vehicle, according to one embodiment. By way of example, the aerial network resource management and control module 215 includes an optimal network resource identification 501, a network resource deployment 503, a network resource monitoring 505, a network and aerial resource security manager 507, an inter-vehicle communications controller 509, a network handover manager 511, a vehicle navigation controller 513, a vehicle replacement dispatcher 515, a vehicle configuration manager 517, a vehicle power management 519, a network resource status update 521, a subscriber location 523, a subscriber network usage 525, a network information 527, a vehicle information 529, an environment information 531, a geographic information system 533, a network resource inventory 535, a vehicle resource inventory 537, a mapping data 539, a geographic information data 541, and an external context 543.

In one embodiment, the optimal network resource identification 501 may identify optimal network resources upon detecting a requirement for additional network capabilities. In another embodiment, the optimal network resource identification 501 may identify the likelihood of specific patterns of network, aerial vehicle and/or the environment for managing and controlling the aerial vehicle network services.

In one embodiment, the network resource deployment 503 may dynamically allocate and deploy one or more vehicles (e.g., UAV) to a location where dynamic deployment of networking resources is required. In one scenario, terrestrial networking, and dynamic aerial networking resources may be deployed to a location that needs additional network resources. In one example embodiment, the one or more deployed network resources may act as DASs, routers/hotspots, small cells, power sources, radio repeaters, location beacons, location triangulators (e.g., progressive location triangulation utilizing UAVs), radio sniffers, etc.

In one embodiment, the network resource monitoring 505 may determine usage pattern by one or more subscribers by monitoring the service and network usage from the network, one or more UE 101, or a combination thereof. In one scenario, the historical usage information may also be used to predict usage demands. In another embodiment, the network resource monitoring 505 may monitor the subscribers' location and the service usage to configure network resources for providing optimal service to the subscriber. In one scenario, the network resource monitoring 505 may predict optimal network configuration changes as subscribers change their location and service usage. In a further embodiment, the network resource monitoring 505 may monitor and notify utility information (electric, water, gas, etc.), the electronic and physical information, or a combination thereof.

In one embodiment, the network and aerial resource security manager 507 may collect, analyze and utilize the network information (e.g., security events, etc.) for leveraging wireless communication using a vehicle. In another embodiment, the network and aerial resource security manager 507 may monitor and report electronic and physical security.

In one embodiment, the inter-vehicle communications controller 509 may control the communication between one or more vehicles deployed to provide additional network resources. In one scenario, one or more aerial vehicle may communicate with each other regarding network resource information, location information, vehicle diagnostic information etc. In one example embodiment, an aerial vehicle may communicate with other aerial vehicle regarding component failure. Then, the aerial vehicle with damaged component may be replaced by another aerial vehicle.

In one embodiment, the network handover manager 511 may seamlessly handover networking services from one networking resource (e.g., drone, cell tower) to another without the user losing network service. In one example embodiment, both the endpoint receiving network service and the network resource (e.g., aerial cell tower) are in motion, and seamlessly transfer an ongoing call or data session from one network resource to another network resource.

In one embodiment, the vehicle navigation controller 513 may navigate one or more aerial vehicle towards the location that requires additional network resources.

In one embodiment, the vehicle replacement dispatcher 515 may implement machine learning methods to replace vehicles based on vehicle diagnostic information, for example, battery levels, component failure, etc. In another embodiment, the vehicle replacement dispatcher 515 may implement methods to geographically concentrate vehicles based on network information, for example, network coverage, number of lower hierarchy nodes connected etc. In a further embodiment, the vehicle replacement dispatcher 515 may dynamically route return communications through nodes back to an originator of a request. One embodiment for optimizing information flow is for "replacement" UAVs to assume the IP address of the "replaced" UAV.

In one embodiment, the vehicle configuration manager 517 may configure heterogeneous UAVs to perform various actions, for example, to recharge, re-data (unload data and then clear data memory), re-supply, reconfigure etc. In another embodiment, the vehicle configuration manager 517 may configure one or more aerial vehicles (e.g., UAVs) to automatically return to its pre-defined base location in the event some or all UAV communications are lost. In a further embodiment, the vehicle configuration manager 517 may dynamically configure aerial network resources based on subscriber location and subscriber's network service usage. The network services may be provided to subscribers by dynamically configuring or re-configuring aerial ad-hoc networks in response to subscriber location and service usage.

In one embodiment, the vehicle power management 519 may dynamically provide network services in diverse geographies without supporting utilities (e.g., electric power). In one scenario, the one or more deployed network resources may act as power sources in geographies without power. In a further embodiment, the vehicle power management 519 may assemble and update one or more heterogeneous aerial vehicles from modular components (including airframe, networking, power, data storage and sensor modules) to adapt to changing networking and environmental requirements and conditions. In a further embodiment, the aerial vehicles may be tethered to cable or cord for the purpose of supplying power to the vehicle from the surface of the earth or the aerial vehicles may contain battery circuitry for recharging wirelessly.

In one embodiment, one or more networks, one or more vehicles, environment training data, or a combination thereof are vector quantized by the network resource status update 521. The network resource status update 521 may process the information by a machine-learning algorithm, and then updates the predictive model. In one example embodiment, the aerial vehicle data is vector quantized, processed by a machine-learning algorithm (the predictive model may be updated), and the predictive model is used to produce a prediction result (e.g., a confidence score that a particular aerial vehicle pattern is recognized). Further, the network resource status update 521 may dynamically assemble heterogeneous aerial vehicles to adapt to changing networking and environmental requirements and conditions.

In one embodiment, the subscriber location 523 may obtain location information for one or more subscriber via GPS, cell sector, cell triangulation, progressive triangulation utilizing UAVs, environmental network location indications (e.g., location beacons, known Wi-Fi hotspots), etc.

In one embodiment, the subscriber network usage 525 may receive network usage information from the network resource monitoring 505. Then, the subscriber network usage 525 may co-ordinate with the vehicle configuration manager 517 to dynamically configure aerial network resources based, at least in part, on subscriber's network service usage.

In one embodiment, the network information 527 may collect, analyze and utilize network information including location (e.g., cell sector, GPS, beacon), capacity, connections, mapping, latency, nearby nodes, packet loss, jitter, (least cost) routing, security events, etc.

In one embodiment, the vehicle information 529 may collect, analyze and utilize (aerial) vehicle information including location (e.g., cell sector, GPS, beacon), altitude, speed, temperature, remaining power, sensor data, inter-vehicle communications, inter-vehicle locations/distances, etc.

In one embodiment, the environment information 531 may collect, analyze and utilize environment information including location (e.g., cell sector, GPS, beacon), altitude, temp., wind, sensor data, etc. In another embodiment, the environment information 531 may utilize advanced cameras to map environment in real-time.

In one embodiment, the geographic information system 533 may determine needs for additional network capabilities, for example, geographic areas that experience natural disasters may need additional networking resources. In another embodiment, the geographic information system 533 may predict future network resource requirements by leveraging historical and geographical information system (GIS), mapping information, etc. In a further embodiment, the geographic information system 533 may create dynamic geographic network service patterns based on the available network resources. In one example embodiment, a "Donut" pattern around an LTE cell site may be created with UAVs extending that cell site's reach. Additionally or alternatively, the geographic "Donut" may expand via concentric "Donuts", for example, peer-to-peer and/or mesh connected UAVs. Other geographic network service patterns are also possible, e.g., hub and spoke.

In one embodiment, the network resource inventory 535 and the vehicle resource inventory 537 may store information on the availability of aerial vehicles to be deployed for providing additional network resources. In one scenario, the one or more aerial vehicles may be categorized based, at least in part, on their capability information (e.g., provisioning of network resources).

In one embodiment, the mapping data 539 may map cell coverage and/or network service to fill the gaps in network service.

In one embodiment, the geographic information data 541 may store information on physical location of the subscriber (location may be obtained via GPS, cell sector, cell triangulation, progressive triangulation utilizing UAVs, environmental network location indications (e.g., location beacons, known Wi-Fi hotspots), etc.).

In one embodiment, the external context 543 may store information on external events, for example, weather information, emergency broadcasts etc.

Figure 6:
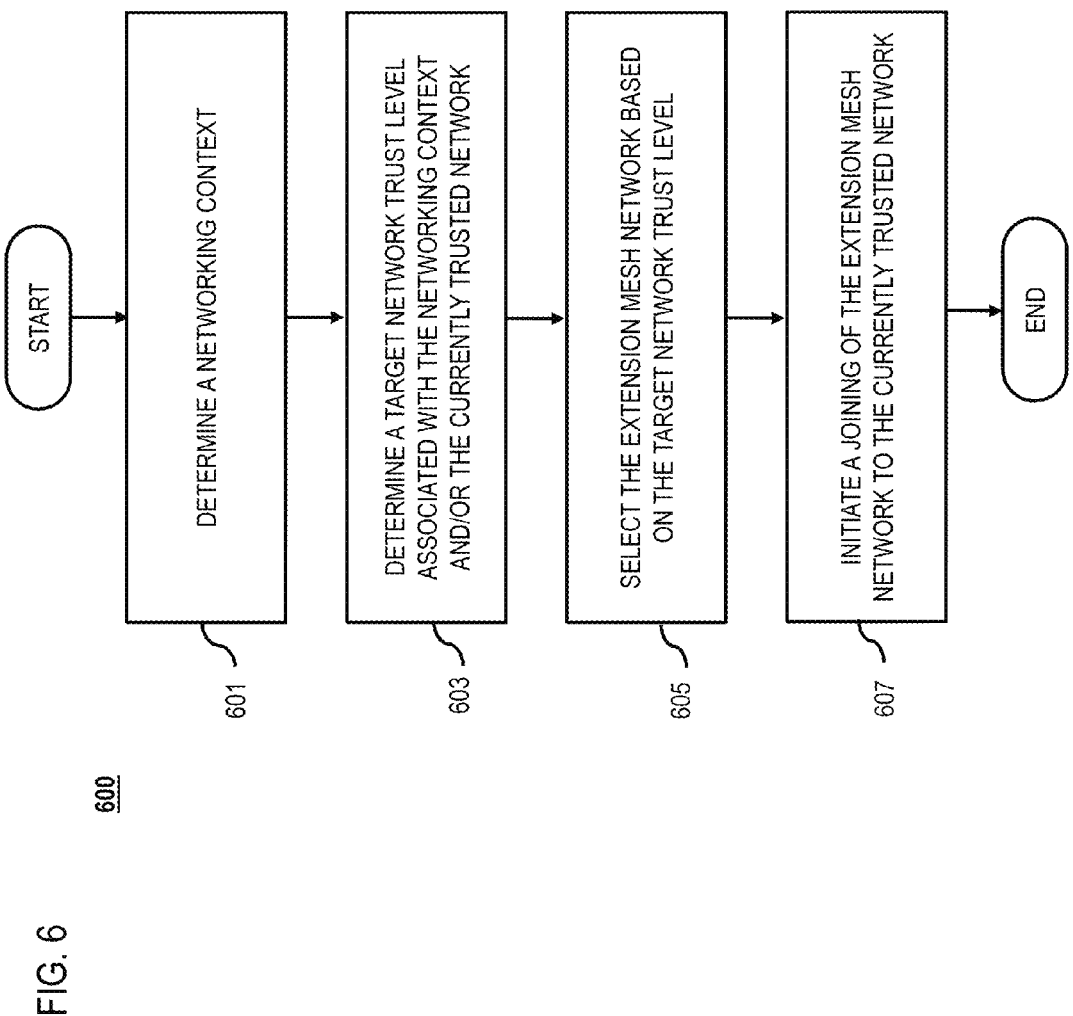
FIG. 6 is a flowchart of a process for determining a target network trust level to join the extension mesh network to the currently trusted network, according to one embodiment.
Figure 33:
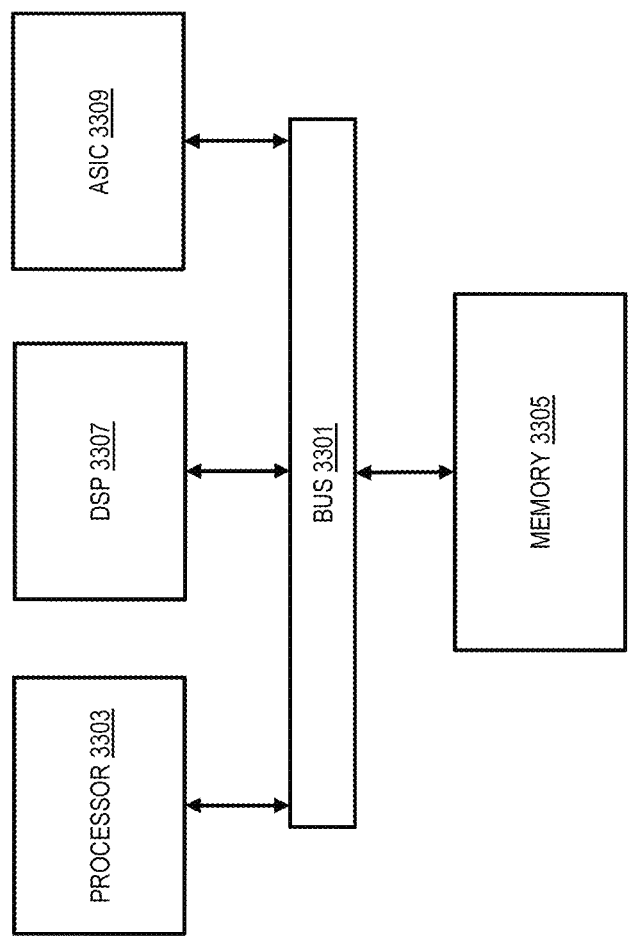
FIG. 33 is a diagram of a chip set that can be used to implement various exemplary embodiments.

FIG. 6 is a flowchart of a process for determining a target network trust level to join the extension mesh network to the currently trusted network, according to one embodiment. In one embodiment, the network extension platform 115 performs the process 600 and is implemented in, for instance, a chip set including a processor and a memory as shown in FIG. 33.

In step 601, the network extension platform 115 may determine a networking context, wherein the networking context initiates a request to join an extension mesh network to a currently trusted network. In one embodiment, the networking context includes an emergency context. In one scenario, the network extension platform 115 may periodically determine the networking context (e.g., an emergency) that warrants mesh network participation. The context may include user location, user's network service plan, remaining data usage available, network service history, and so on. Then, the network extension platform 115 may determine the required trust levels for candidate networks. In one example embodiment, an emergency situation (e.g., a natural disaster) warrants the consideration of joining an extension mesh network. In another embodiment, a currently trusted network may be the trusted point of presence (PoP) between communication entities. In one scenario, PoP is the point at which different networks and/or communication devices build connection with each other.

In step 603, the network extension platform 115 may determine a target network trust level associated with the networking context, the currently trusted network, or a combination thereof. In one embodiment, the network extension platform 115 may periodically determine minimum trust levels for candidate mesh networks, for example, LTE requires high trust level, Wi-Fi requires medium trust level, Bluetooth requires low trust levels. In one scenario, the trust level of the peer nodes, and the trust level of the connections between the nodes are used to calculate the trust score for every network relationship within an extended (e.g., mesh) network. It is contemplated that there may be varied levels of trustworthiness. For example, a user device, a vehicle, a network etc., may be classified as "trusted", "medium trust" and "no trust". On the other hand, it can be classified in terms of scale 1 to 10, a percentage of trustworthiness.

In step 605, the network extension platform 115 may select the extension mesh network based on the target network trust level. In one scenario, the network extension platform 115 may select extension mesh network for extending the network coverage. The selection may be based on the trust scores of the peer nodes, trust level of the connection between the nodes, and trust level of the network relationship outside or within an extended (e.g., mesh) network. In another scenario, a user may participate in an extension network of a certain trust level (e.g., at least "medium" trust) and/or for a specified type of network traffic or service (e.g., emergency communications only). In one embodiment, the extension mesh network is provided via one or more vehicles, and wherein the one or more vehicles include one or more aerial vehicles, one or more terrestrial vehicle, or a combination thereof.

In step 607, the network extension platform 115 may initiate a joining of the extension mesh network to the currently trusted network. In one scenario, the network extension platform 115 may select extension mesh network for joining to the currently trusted network based, at least in part, on the trust level score of one or more network relationship. In one example embodiment, the network extension platform 115 may disseminate a communication with a low level of privacy through less trusted network, while direct private communication through trusted networks.

Figure 7:
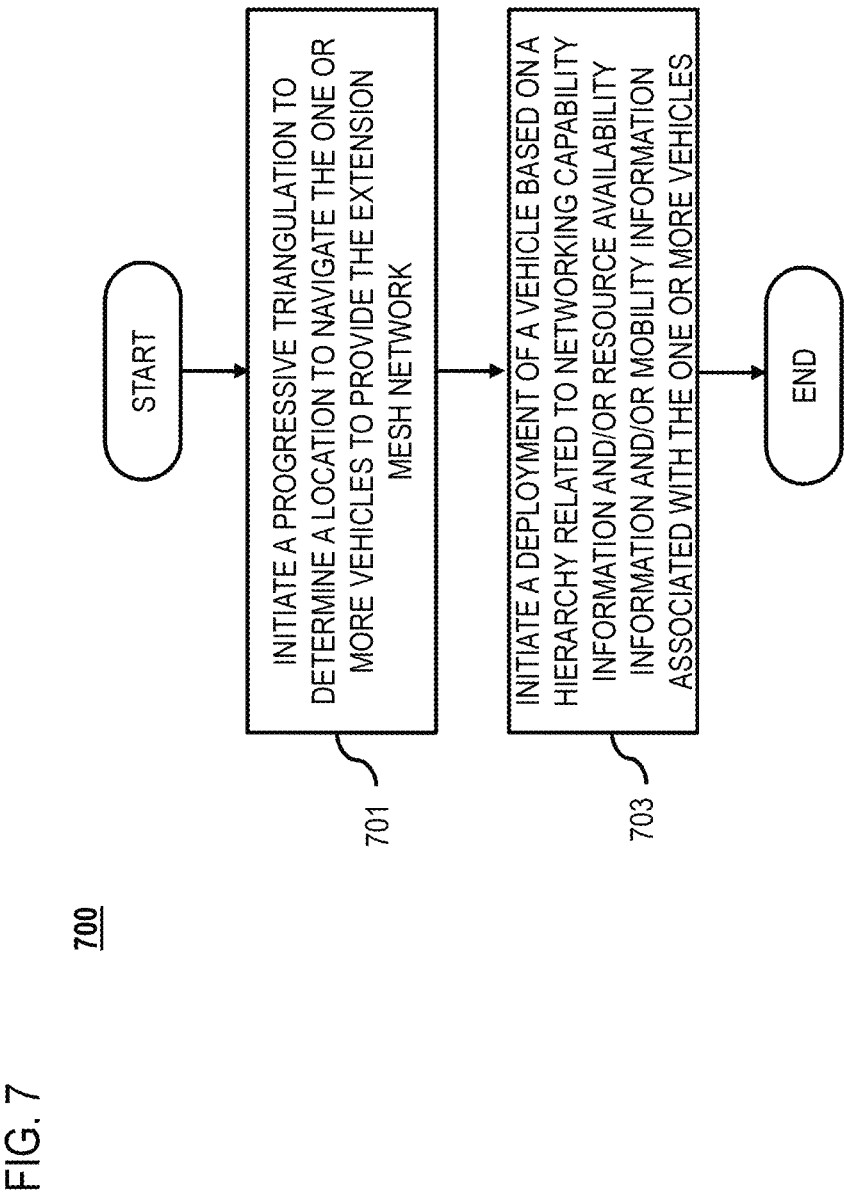
FIG. 7 is a flowchart of a process for determining a location to navigate one or more vehicles for providing extension mesh network, according to one embodiment

FIG. 7 is a flowchart of a process for determining a location to navigate one or more vehicles for providing extension mesh network, according to one embodiment. In one embodiment, the network extension platform 115 performs the process 700 and is implemented in, for instance, a chip set including a processor and a memory as shown in FIG. 33.

In step 701, the network extension platform 115 may initiate a progressive triangulation to determine a location to navigate the one or more vehicles to provide the extension mesh network. In one scenario, the network extension platform 115 may determine the networking context for a location via progressive triangulation utilizing an airborne vehicle. Then, the network extension platform 115 may cause an airborne vehicle to navigate towards the location without network coverage for dynamic provisioning of network connectivity.

In step 703, the network extension platform 115 may initiate a deployment of the one or more vehicles based on a hierarchy related to networking capability information, resource availability information, mobility information, or a combination thereof associated with the one or more vehicles. In one scenario, the network extension platform 115 may select an aerial vehicle for network extension based, at least in part, on their network coverage potential. In another scenario, the network extension platform 115 may deploy a vehicle based, at least in part, on the battery level of the functioning vehicle to ensure uninterrupted extension of network coverage. In one example embodiment, the network extension platform 115 may deploy an aerial vehicle if the location necessitating network extension is inaccessible by terrestrial vehicles.

Figure 8:
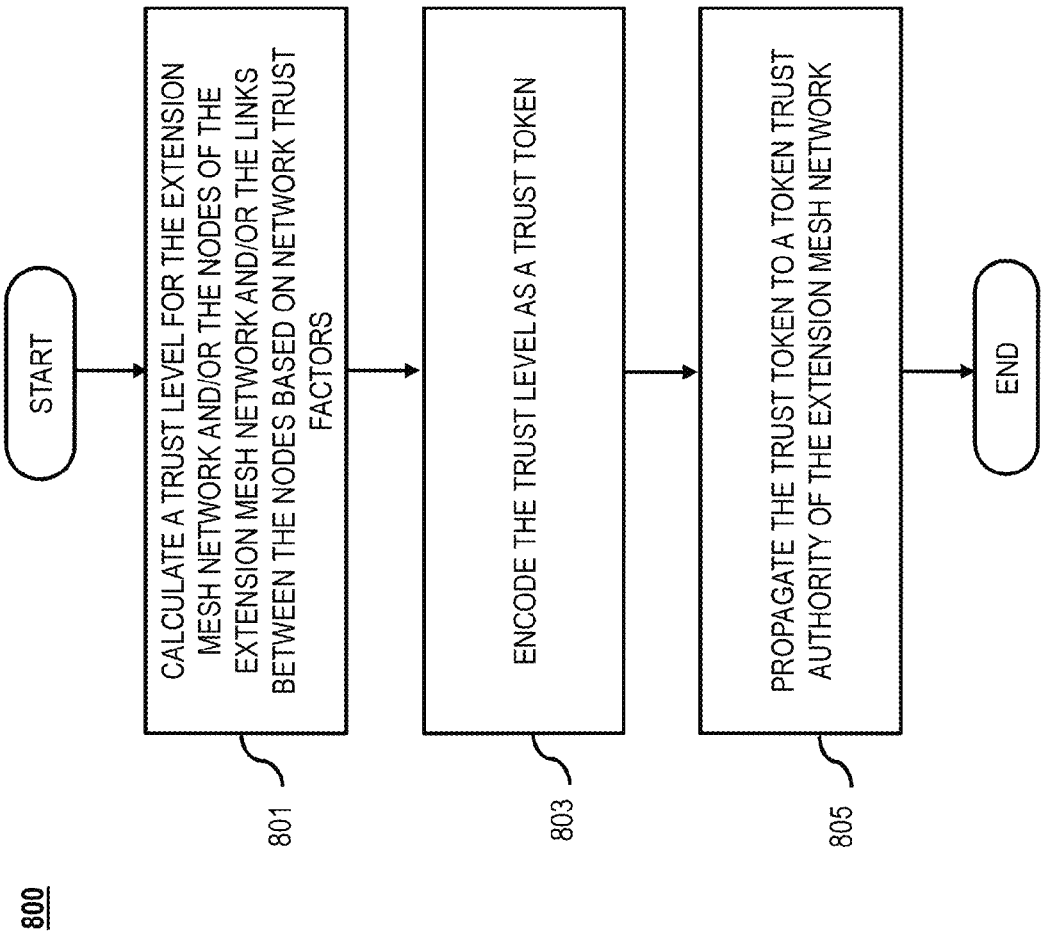
FIG. 8 is a flowchart of a process for calculating a trust level, and encoding the trust level as a trust token, according to one embodiment.

FIG. 8 is a flowchart of a process for calculating a trust level, and encoding the trust level as a trust token, according to one embodiment. In one embodiment, the network extension platform 115 performs the process 800 and is implemented in, for instance, a chip set including a processor and a memory as shown in FIG. 33.

In step 801, the network extension platform 115 may calculate a trust level for the extension mesh network, one or more nodes of the extension mesh network, one or more links between the one or more nodes, or a combination thereof based on one or more network trust factors. In one embodiment, the selection of the extension mesh network is based on a comparison of trust level score against the target network trust level. In another embodiment, the one or more network trust factors include a number of network hops from the currently trusted network, a location, a network type, a number of peer connections, whether the one or more nodes are known, whether the extension mesh network is known, a communication history, or a combination thereof.

In step 803, the network extension platform 115 may encode the trust level as a trust token. One exemplary embodiment of network trust propagation is the use of SSL-protected tokens that can be verified by the originating trusted network and/or the intermediate nodes. In one scenario, the currently trusted network utilizes network extension trust factors to calculate trust levels for nodes and their network connections. Then, the currently trusted network securely transfers information to a node in the form of a transitive trust token.

In step 805, the network extension platform 115 may propagate the trust token to a token trust authority of the extension mesh network. In one embodiment, the token trust authority is selected from among the one or more nodes of the extension mesh network. In another embodiment, the token trust authority generates another trust token for a subsequent token trust authority selected in the extension mesh network, another extension mesh network, or a combination thereof; and propagates the another trust token to the subsequent token trust authority.

Figure 9:
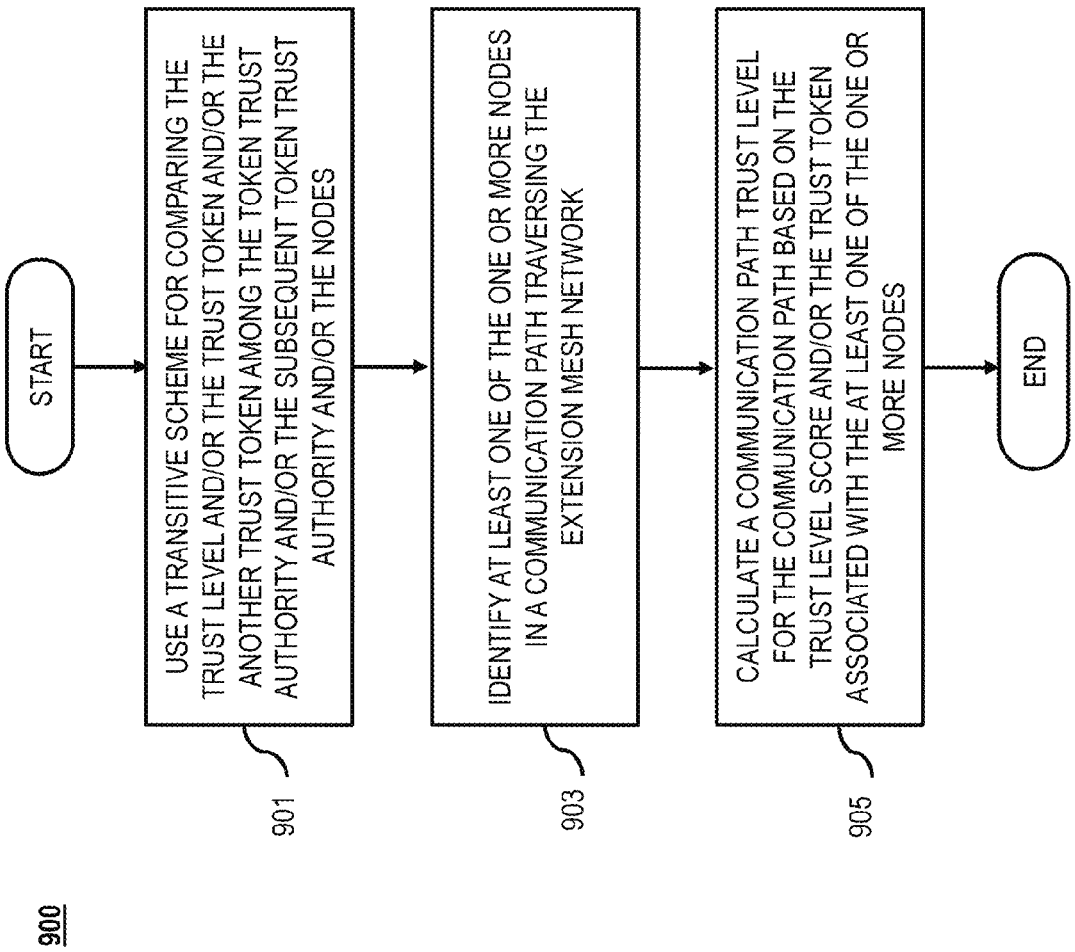
FIG. 9 is a flowchart of a process for calculating a communication path trust level for the communication path, according to one embodiment.

FIG. 9 is a flowchart of a process for calculating a communication path trust level for the communication path, according to one embodiment. In one embodiment, the network extension platform 115 performs the process 900 and is implemented in, for instance, a chip set including a processor and a memory as shown in FIG. 33.

In step 901, the network extension platform 115 may use a transitive scheme for comparing the trust level, the trust token, the another trust token, or a combination thereof among the token trust authority, the subsequent token trust authority, the one or more nodes, or a combination thereof. In one scenario, the trusted point of presence in the network extension utilizes the network extension trust factors (e.g., number of hops from the trusted point of presence, physical location of the node, network type, number of peer connection, known node, known network, communication history etc.) to calculate the trust factors for nodes and network connections. Then, the trusted point of presence securely transfers the information to the trusted node in the form of a transitive trust token. Subsequently, the node become the trusted point of presence and performs network extension trust factors calculations for other nodes and networks.

In step 903, the network extension platform 115 may identify at least one of the one or more nodes in a communication path traversing the extension mesh network. In one scenario, the trust score of a communication path between the nodes is determined by the lowest trust score of the hops made to establish an end to end path.

In step 905, the network extension platform 115 may calculate a communication path trust level for the communication path based on the trust level, the trust token, or a combination thereof associated with the at least one of the one or more nodes.

Figure 10:
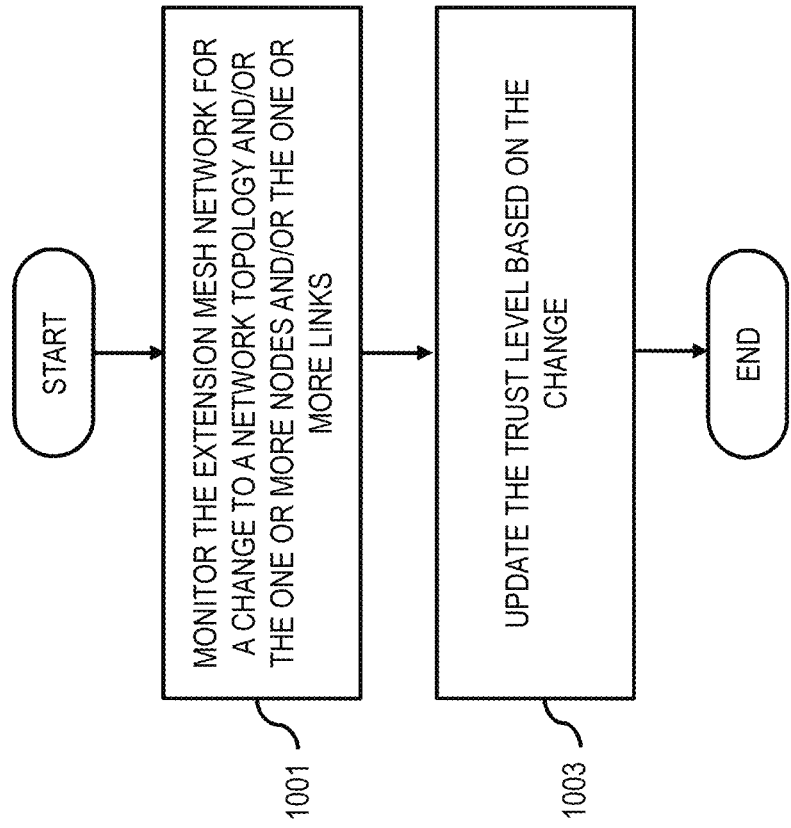
FIG. 10 is a flowchart of a process for monitoring the extension mesh network for a change and updating the trust level based on the change, according to one embodiment.

FIG. 10 is a flowchart of a process for monitoring the extension mesh network for a change and updating the trust level based on the change, according to one embodiment. In one embodiment, the network extension platform 115 performs the process 1000 and is implemented in, for instance, a chip set including a processor and a memory as shown in FIG. 33.

In step 1001, the network extension platform 115 may monitor the extension mesh network for a change to a network topology, the one or more nodes, the one or more links, or a combination thereof.

In step 1003, the network extension platform 115 may update the trust level based on the change. In one scenario, the network extension platform 115 may periodically update the network context, network status and extension network trust scores. In another scenario, the network extension platform 115 may monitor one or more devices, periodically updating trust scores for one or more nodes separately.

Figure 11:
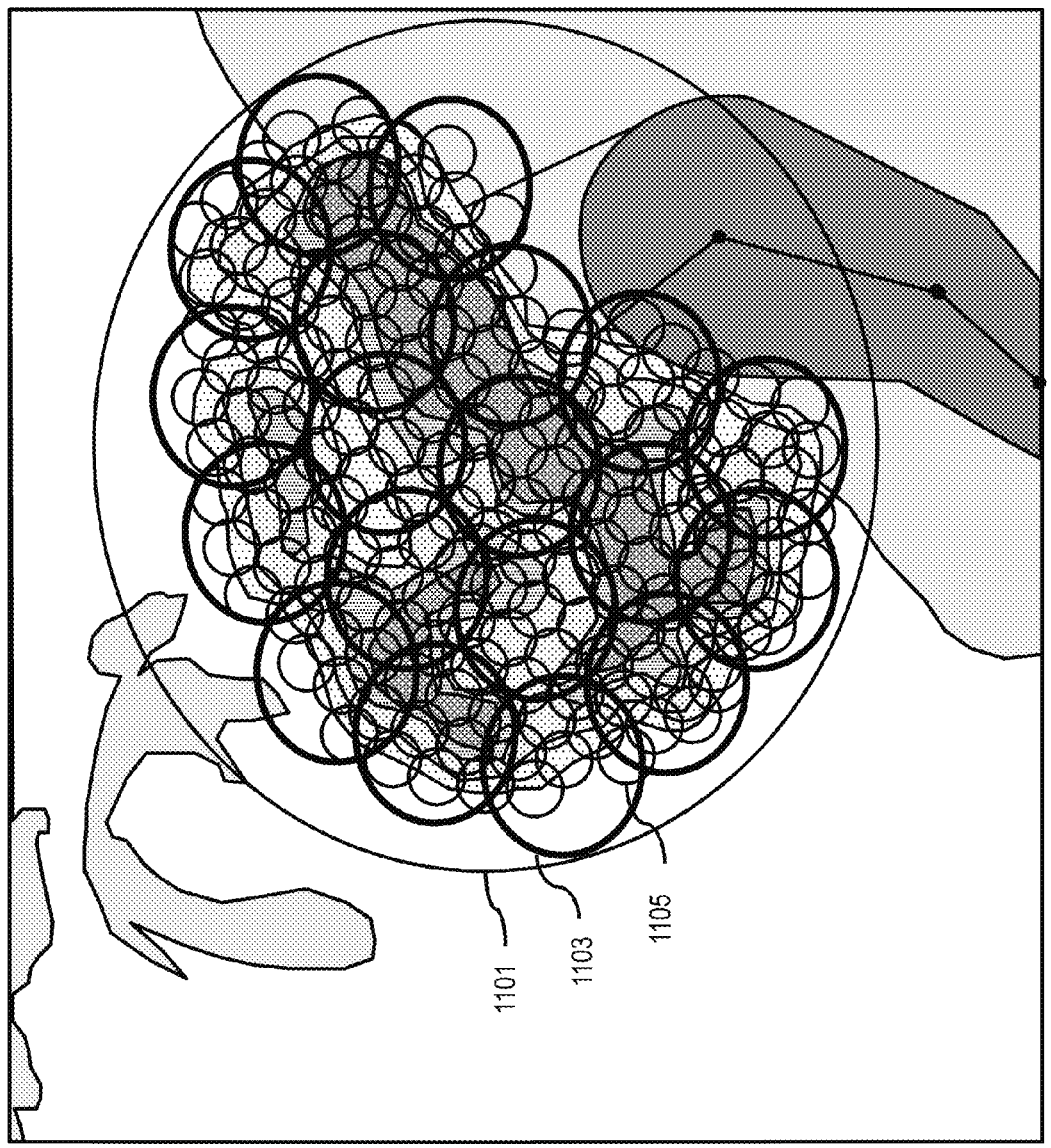
FIG. 11 is a diagram of a dynamically distributed network resources, according to one example embodiment.

FIG. 11 is a diagram of dynamically distributed network resources, according to one example embodiment. FIG. 11 includes macro-level [1101], mid-level [1103] and micro level [1105] of network coverage. Each of these levels represents a different level of granularity of network resource coverage, management and control. The coverage of these levels may be performed by several types of vehicles, for example, an aerial vehicle (a satellite, an airplane, a helicopter, a balloon, an airship), a terrestrial vehicle, one or more UE 101 etc. The levels of network coverage may vary per equipment used for coverage. For example, macro-level [1101] network coverage may be performed by a satellite, while a terrestrial vehicle or a mobile phone may perform coverage in a micro level [1105]. Each of the levels defined may use different inter communication wireless protocol or different communication wireless protocols from one level to another. Further, the potential use of multiple communication wireless protocols could be used to provide optimization of design for long range communications, short range communications, power reduction or a combination of one or more. In another embodiment, the vehicles may be connected with a wired connection between the levels with a wired connection and/or to the ground for power and/or communications purposes.

In one scenario, an area affected by a natural disaster or other events (e.g., a failure in a fixed network coverage distribution point, an abnormally high demand for communication signals etc.) may require an extension of network coverage, whereupon a dynamic deployment of networking resources may be procured to maintain continuous network services.

In another scenario, power disruptions, communications disruptions, utilities or service disruptions may be remedied by dynamically deploying resources to an area that experiences frequent disruptions or is expected to experience disruptions. In one embodiment, the network extension platform 115 is capable of monitoring subscribers' location and the service usage, to provide optimal network services to the subscribers. In another embodiment, the network extension platform 115 may predict optimal network configuration changes as subscribers change their location and/or change their service usage pattern. In one scenario, a subscribers' location may be obtained via GPS, cell sector, cell triangulation, progressive triangulation utilizing UAVs, environmental network location indications (e.g., location beacons, known Wi-Fi hotspots), etc. In another scenario the subscribers' usage pattern may be determined by monitoring service and network usage from the network and/or the user's UE 101. After obtaining subscribers' location information and the service usage information, the network extension platform 115 may predict future network resource disruptions and requirements by using historical and Geographical Information System (GIS)/mapping information. In one example embodiment, a subscriber is driving to his/her home listening to a broadcast on his/her phone, the network extension platform 115 may predict that the subscriber requires continuous network resources as he/she continues to travel on the roadway. Based on this information, the network extension platform 115 may predict that the subscriber needs additional resources to be able to receive the broadcast throughout his/her journey. Accordingly, in case of high demand for additional network resources, the network extension platform 115 may deploy aerial vehicles with supplementary resources to the area in order to avoid service disruption.

Figure 12:
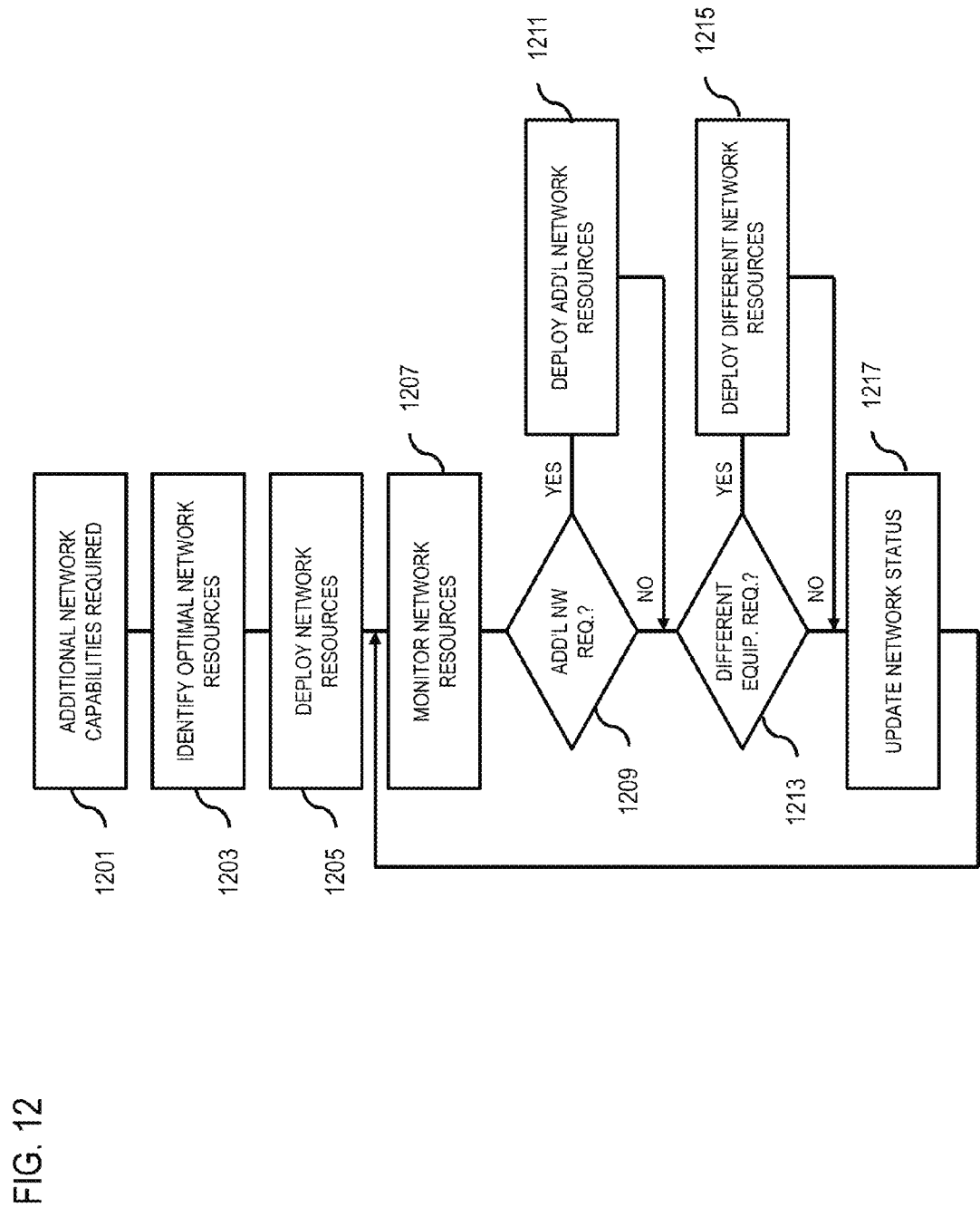
FIG. 12 is a flowchart for dynamic distribution of networking resources, according to one example embodiment.

FIG. 12 is a flowchart for dynamic distribution of networking resources, according to one example embodiment. It is contemplated that the following steps can be performed for deployment of any type of resources, including but not limited to deployment of aerial vehicles or a terrestrial vehicles.

In step 1201, the network extension platform 115 may determine the contextual information to recognize the requirement of additional network capabilities. In one scenario, the contextual information may include user information, vehicle information, UE 101 information, network information, environment information, or a combination thereof. The user information may include profile information such as name, address, phone number associated with the user, user history, trust score, etc. The vehicle information may include location information, location history information, trust score information, programming information, operating capacity information, vehicle stabilization information, any other data from the vehicle, etc. The environment information may include wind strength information, sun light information, air humidity information, radiation information, biological information, any other information collected from the environment, etc.

In step 1203, the network extension platform 115 may identify the optimal network resources. At step 1203 the network extension platform 115 may evaluate the context in order to decide the manner of deployment, the location at which the resources are to be deployed, and the measure of the resources to be deployed. In one example, the network extension platform 115 may determine that it is more efficient to deploy an aerial vehicle to function as a point for network distribution, as opposed to a terrestrial vehicle that may not be able to cover the same area. At step 1205, the network extension platform 115 may deploy the network resources in a manner determined in step 1203. In step 1207, the network extension platform 115 may monitor the network resources that have been deployed. This process involves overviewing the communication traffic, the equipment (e.g., a drone) resistance and capabilities, or any other feature involved with the extension of network coverage. For example, the network extension platform 115 may monitor the performance and the potential of an aerial vehicle during the network extension process. The monitoring may occur in real-time, as per schedule, as per request, or a combination thereof.

In step 1209, the network extension platform 115 may determine the need for additional network resources. The network extension platform 115 may deploy additional network resources [1211] based, at least in part, on a determination that additional network resources are required. In step 1213, the network extension platform 115 may check whether a different type of network resources or equipment is necessary. For one example embodiment, a trusted node or point of connection may become untrustworthy or unavailable, whereupon a terrestrial emergency communications resource may be utilized for providing network coverage. In another example embodiment, a geographical formation (e.g., a mountain) may prevent a terrestrial vehicle from provisioning better network coverage, whereupon an aerial vehicle may be deployed [1215].

In step 1217, the network extension platform 115 may update the network status. In one scenario, an update may indicate that deployment of an additional resource, or that a substitution of a terrestrial vehicle by an aerial vehicle for procuring additional resources was sufficient for optimum network coverage. In another scenario, an update may also indicate that a trust score for a node, a network connection, and/or a vehicle, has changed and the change is reflected in determining network coverage extension in an optimum manner. In a further scenario, an update may include classifying and tagging trust scores to nodes or point of connections. For example, a user history may indicate that user equipment is not a trusted point of connection, then the network status needs updating depending on the influence that the user equipment has in the network trustworthiness.

Figure 13:
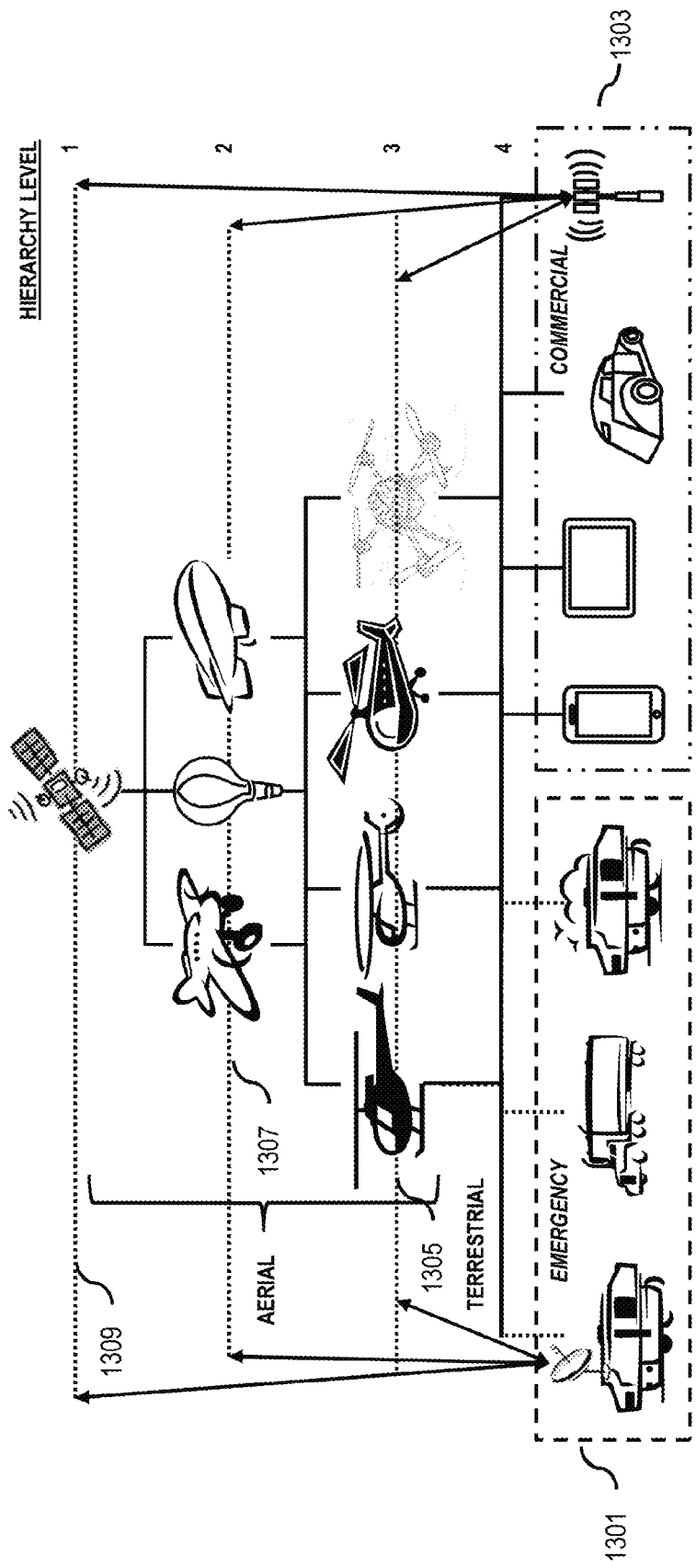
FIG. 13 is a diagram that represents the hierarchy of the one or more vehicles (e.g., aerial and terrestrial vehicles) for providing dynamic networking resources, according to one example embodiment.

FIG. 13 is a diagram that represents the hierarchy of the one or more vehicles (e.g., aerial and terrestrial vehicles) for providing dynamic networking resources, according to one example embodiment. In one scenario, the first level [1309] includes a satellite that may cover macro level granularity of network resource coverage, management and control. The second and third level [1307, 1305] includes one or more aerial vehicles for providing mid-level granularity of network resource coverage, management and control. The fourth level [1303] includes terrestrial vehicles for providing micro level network coverage. In one scenario, the network providing vehicles in different level may communicate with each other to provide continuous network coverage, and allow for secure network extension. In one example embodiment, at least one vehicle in a different level may replace another vehicle for providing better network coverage.

Figure 14:
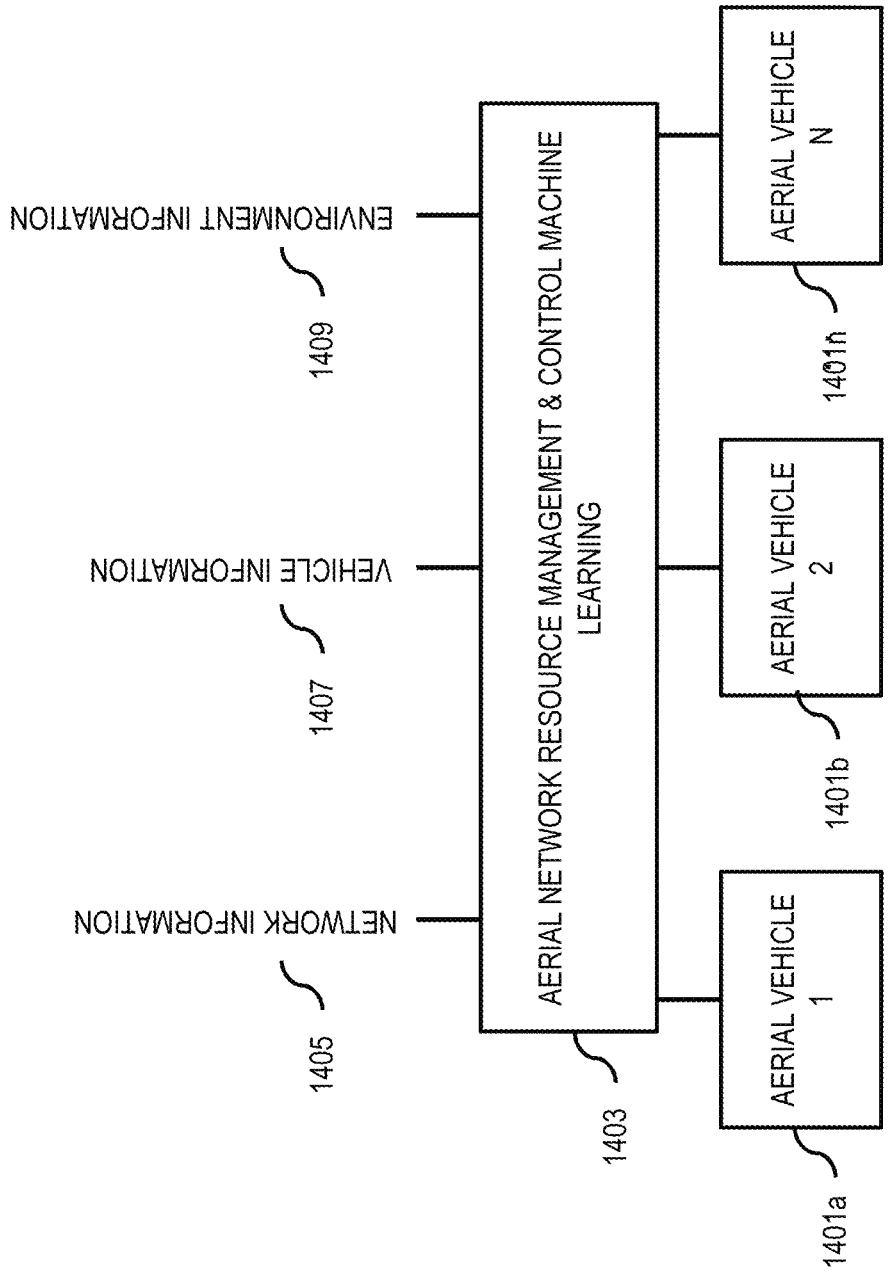
FIG. 14 is a diagram that represents the functioning of an aerial networking resource management and control machine learning system, according to one example embodiment.

FIG. 14 is a diagram that represents the functioning of an aerial networking resource management and control machine learning system, according to one example embodiment. In one scenario, the aerial networking resource management and control machine learning system 1403 may accesses information from various aerial vehicles [1401a-1401n]. In one embodiment, the aerial network resource management and control machine learning system 1403 is able to collect several types of information such as network information 1405, vehicle information 1407, environment information 1409, or any other information that may be relevant for the network extension efforts. This information are captured or collected by any aerial vehicle 1401a-1401n.

In one embodiment, the aerial network resource management and control module 215 may utilize the information retrieved by the aerial networking resource management and control machine learning system 1403. In another embodiment, the aerial networking resource management and control machine learning system 1403 may co-ordinate with the aerial network resource management and control module 215 to control and manage the aerial vehicles 1401a-1401n. In one example embodiment, the aerial network resource management and control machine learning system 1403 may identify that an aerial vehicle 1401a-1401n is positioned in a non-optimal location, or the battery level for one or more aerial vehicle is low, or the vehicle 1401 needs to move in order to optimize the network coverage extension. In one scenario, information on vehicles 1401 moving to optimize the network coverage may be shared with the network resource management and control module 215. Then, the network resource management and control module 215 may move the vehicle 1401 to its optimal position, or may substitute the vehicle for another vehicle, or may take any other action that will optimize the resource utilization. In another scenario, the network resource management and control machine learning system 1403 may monitor the movement of the vehicle 1401 and may confirm that the vehicle is located in the correct position. Subsequently, the information may be shared with the network resource management and control module 215.

Figure 15:
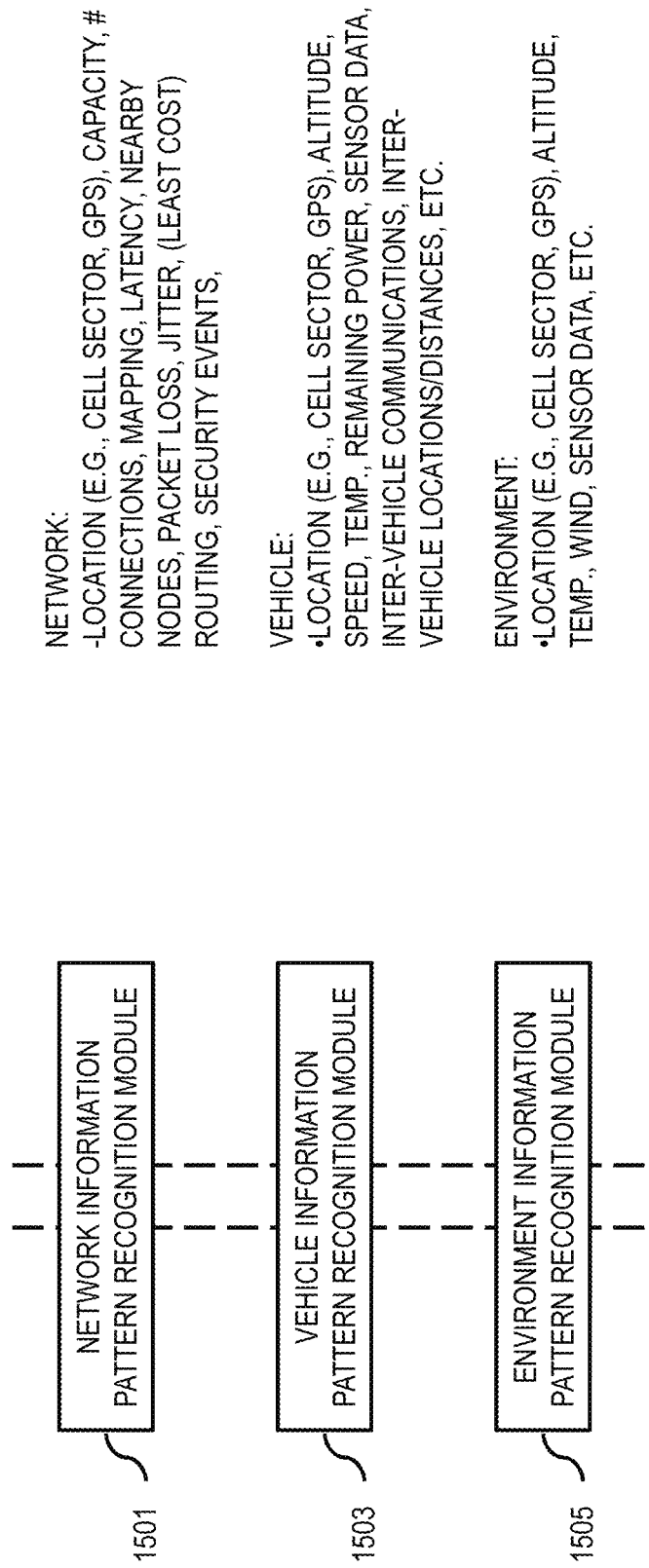
FIG. 15 is a diagram that represents pattern recognition mechanisms for one or more networks, one or more vehicles and the environment, according to one example embodiment.

FIG. 15 is a diagram that represents pattern recognition mechanisms for one or more networks, one or more vehicles and the environment, according to one example embodiment. In one embodiment, the network information pattern recognition module [1501], allows for accurate recognition of patterns and data associated with one or more vehicles [1503], the environment [1505], or a combination thereof. In one scenario, the network information may include location (e.g., cell sector, GPS, beacons, etc.) of network failures or disruptions, capacity information, connection types, mapping information, latency, nearby nodes, packet loss, jitter, routing, security events, etc. In another scenario, the vehicle information may include location information, altitude information, speed information, temperature, remaining power, sensor data, inter-vehicle communications, inter-vehicle locations/distances, etc. In a further scenario, the environment information may include location information, altitude information, temperature, wind, radiation information, biological information, sensor data etc.

Figure 16:
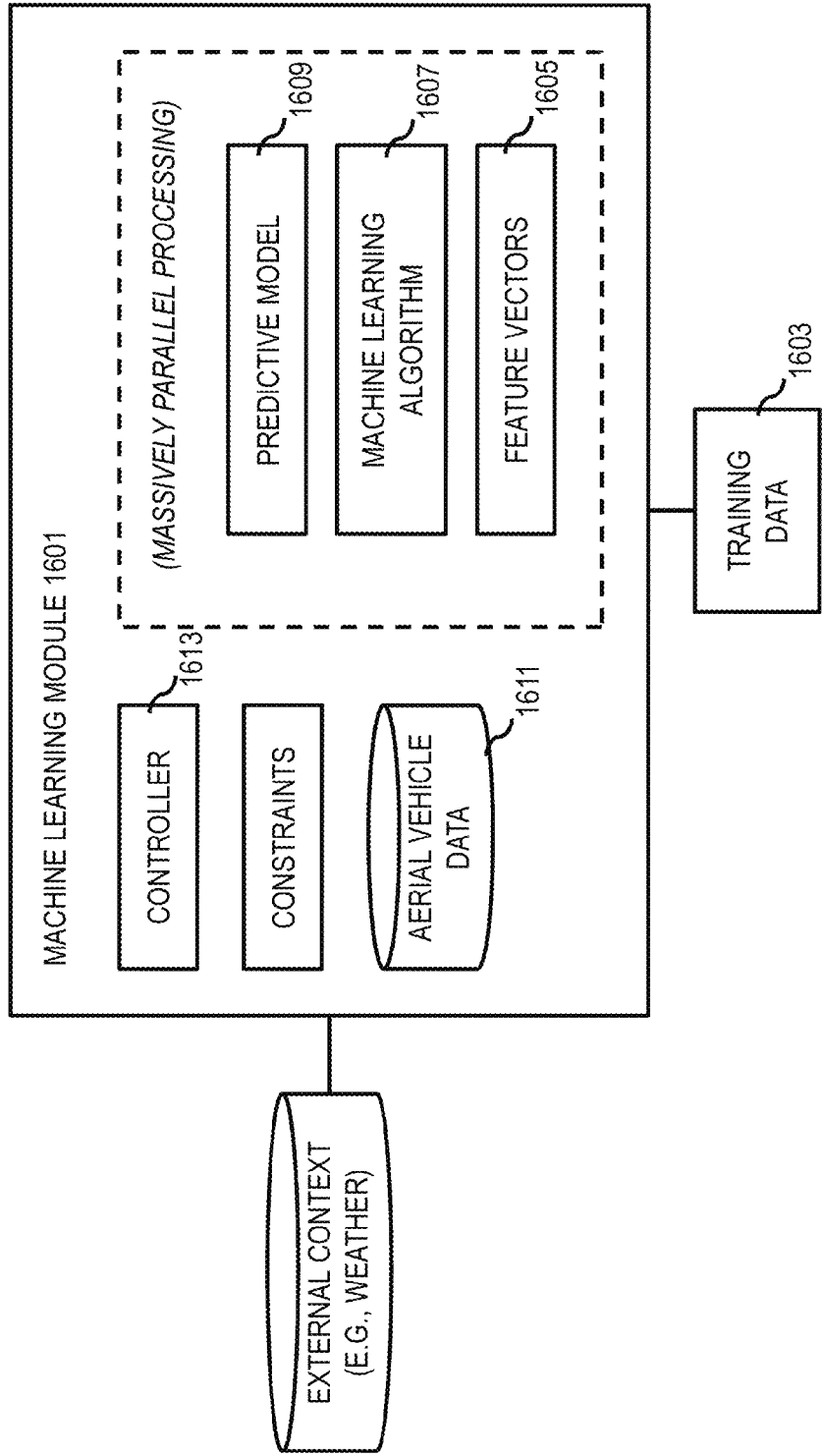
FIG. 16 A is a diagram of a machine-learning module using training data, according to one example embodiment.

FIG. 16A is a diagram of a machine-learning module using training data, according to one example embodiment. In one embodiment, the network, the vehicle and environment training data [1603] are vector quantized [1605], and then processed by a machine-learning algorithm [1607]. Subsequently, the machine-learning module 1601 updates the predictive model [1609]. In another embodiment, machine based learning methods may be used to replace vehicles [1613] based, at least in part, on vehicle diagnostic information [1611] (e.g., battery levels, component failure, etc.). In a further embodiment, the machine based learning methods may be used to geographically concentrate vehicles based on the network information (e.g., coverage, number of lower hierarchy nodes connected, etc.).

Figure 16B:
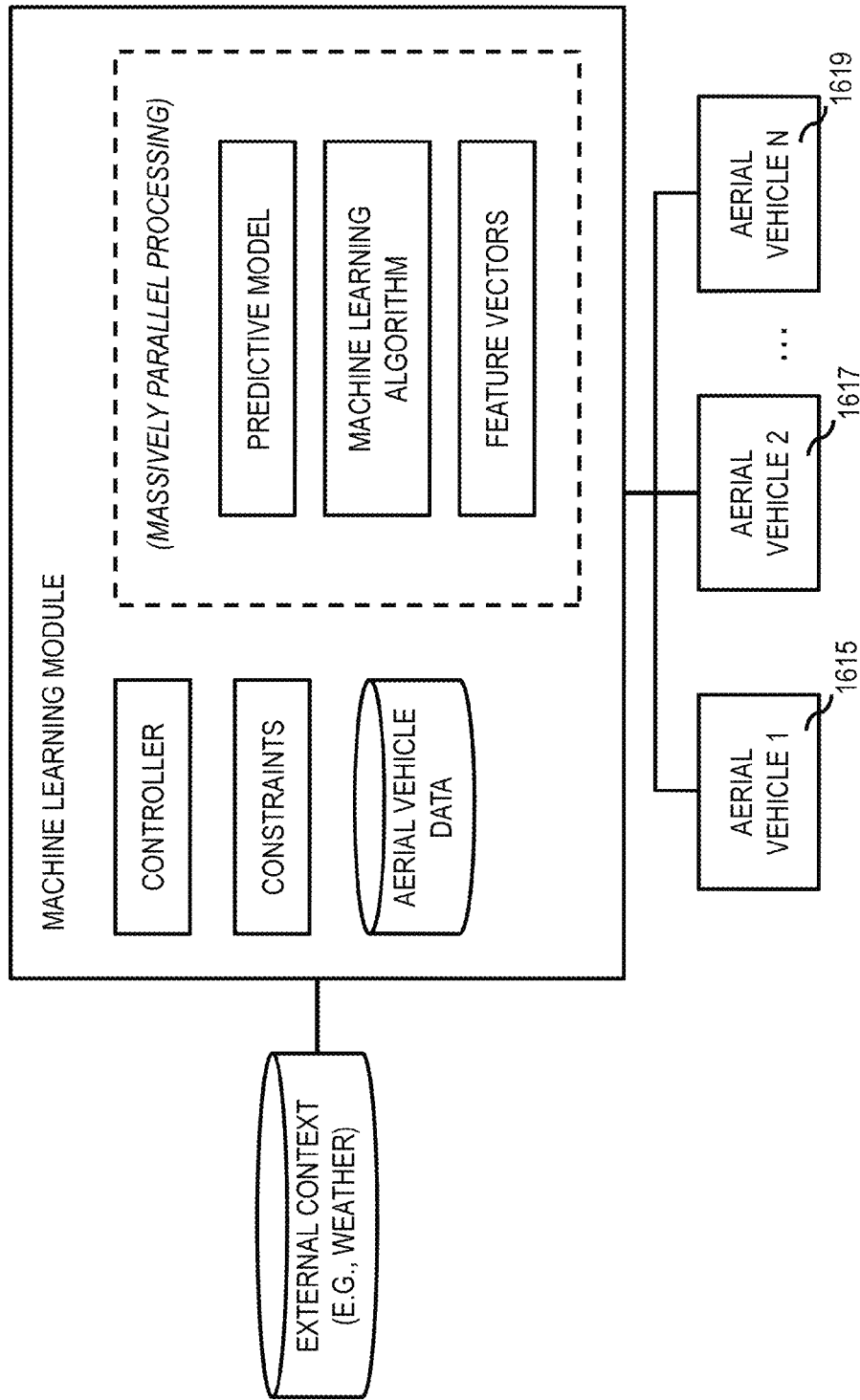

FIG. 16B is a diagram that shows a machine learning module processing the real-time aerial vehicle data, according to one example embodiment. In one scenario, the aerial vehicle data [1615, 1617, 1619] is vector quantized [1605], and then processed by a machine-learning algorithm. Subsequently, the predictive model [1609] may be updated, and the predictive model may be used to produce a prediction result, for example, a confidence score that a particular aerial vehicle pattern is recognized.

FIG. 17 is a diagram that represents a scenario wherein an aerial vehicle under adverse and/or failure conditions may be retrieved, according to one example embodiment. In one example embodiment, an aerial vehicle is deployed for extending network communication in a remote area affected by a natural disaster. In one scenario, the aerial vehicle can be a balloon [1701] or an Unmanned Aerial Vehicle (UAV) [1709]. The aerial vehicle is attached with sensors [1703] (e.g., GPS) to navigate towards the desired location. Once the aerial vehicle has reached the desired location, the GPS tracking device locks the position and the network extension platform 115 may instruct the aerial vehicle to provide network coverage service via sensors [1703], networks [1705] and router [1707]. Further, the aerial vehicle may include a battery bank for flying the aerial vehicle. In one embodiment, the battery bank level is regularly monitored, and if the power drops below a certain level the GPS can be used to navigate the aerial vehicle back to a home base where battery bank can be changed or recharged. In one embodiment, two or more aerial vehicles can be used in shifts to extend operational time and provide overlapping coverage to a larger area. In another scenario, an aerial vehicle may be retrieved based on environmental information (e.g., bad weather conditions) gathered from the sensor [1703]. In yet another scenario, an aerial vehicle operating under adverse and/or failure conditions may be retrieved by directing it to fly into an appropriate physical structure, e.g., a large net acting like a spider web.

Figure 18:
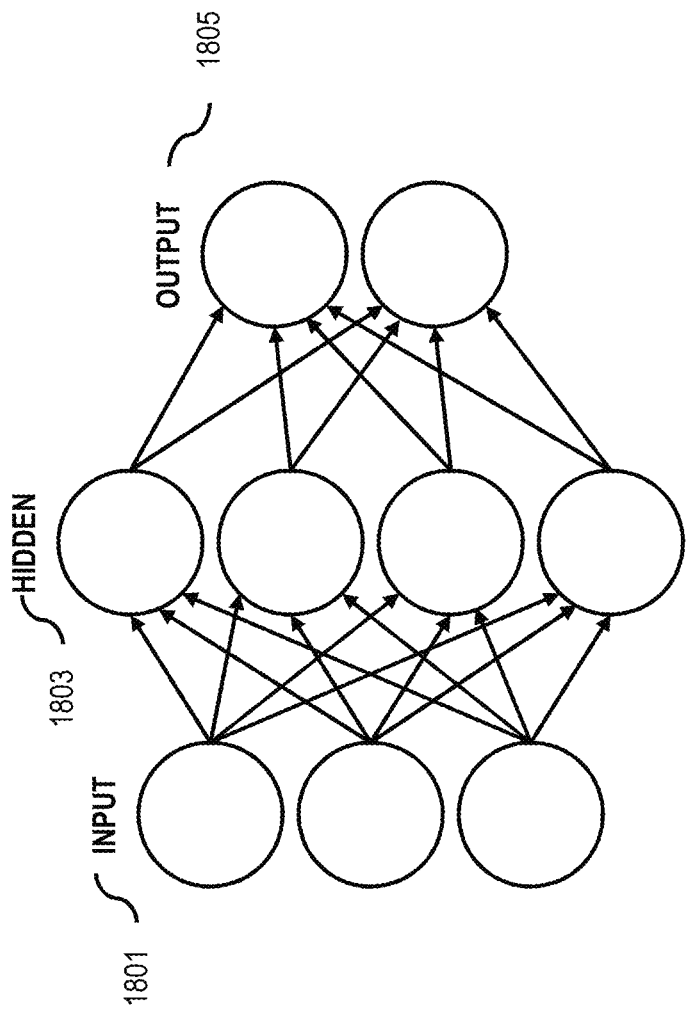
FIG. 18 is a diagram that represents a neural network, according to one example embodiment.

FIG. 18 is a diagram that represents a neural network, according to one example embodiment. In one embodiment, a neural network is capable of modeling complex relationships, and finding patterns in data for machine learning. In one scenario, FIG. 18 includes input neurons 1801, hidden neurons 1803, and output neurons 1805.

In one embodiment, the hidden neurons [1803] allow the neural network to perform continuous recognition tasks, and to model temporal dependencies. The hidden neurons [1803] may be a Hierarchical Hidden Markov Model (HHMM), or may be implemented in an aerial network resource management and control module 215. In another embodiment, the neural network is formed by hidden neurons [1803] that can compute values from inputs [1801] and can activate output neurons [1805]. In a further embodiment, the interconnected neural network allows for a set of inputs which may be activated by the information received. This information may be network information, vehicle information, environment information, or a combination thereof. After this information is weighted and transformed by a function, the activation is then passed to other artificial neurons. This process occurs until an output [1805] is activated. In one scenario, an output is given an incorrect value/information, the neural network may be able to identify the hidden neurons [1803] responsible for the incorrect values. Once this is discovered, the weight and values of the hidden neurons [1803] that committed the error may be recalculated and updated. This allows for the neurons to avoid future errors. Accordingly, any inconsistency that occurs when deploying an aerial vehicle, directing traffic in a network, or computing environment information, may be corrected by the neural network.

Figure 19:
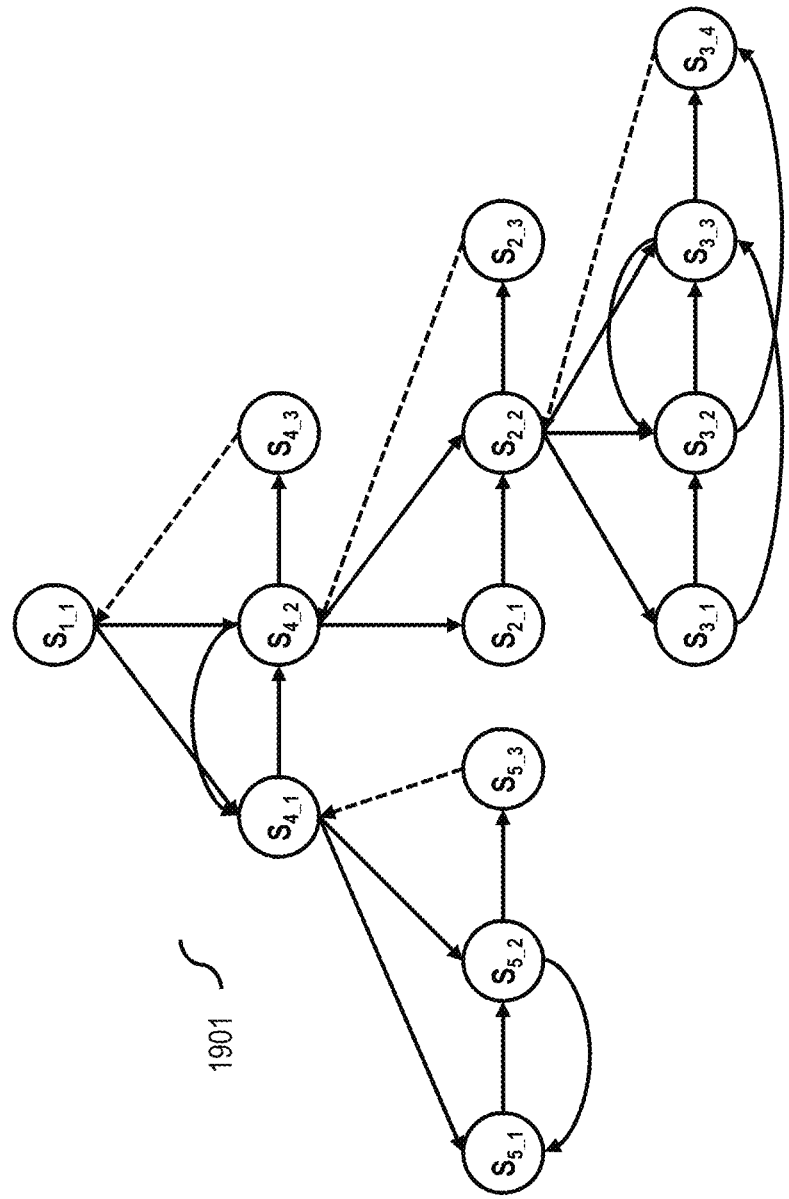
FIG. 19 is a diagram that represents the Hierarchical Hidden Markov Model (HHMM) of a neural network, according to one example embodiment.

FIG. 19 is a diagram that represents the Hierarchical Hidden Markov Model (HHMM) of a neural network, according to one example embodiment. The (HHMM) of a neural network may be used to learn and recognize hierarchical patterns. This capability may be applied to aerial vehicle data for aerial networking resource management and control [1901]. In one embodiment, the HHMM of a neural network is formed by vertical and horizontal transitions, and internal states circles and terminal states that returns control to the activating state. When a state in an HHMM is activated, it activates its own probabilistic model, i.e., activates one of the states of the underlying HHMM, which in turn may activate its underlying HHMM and so on.

Figure 20:
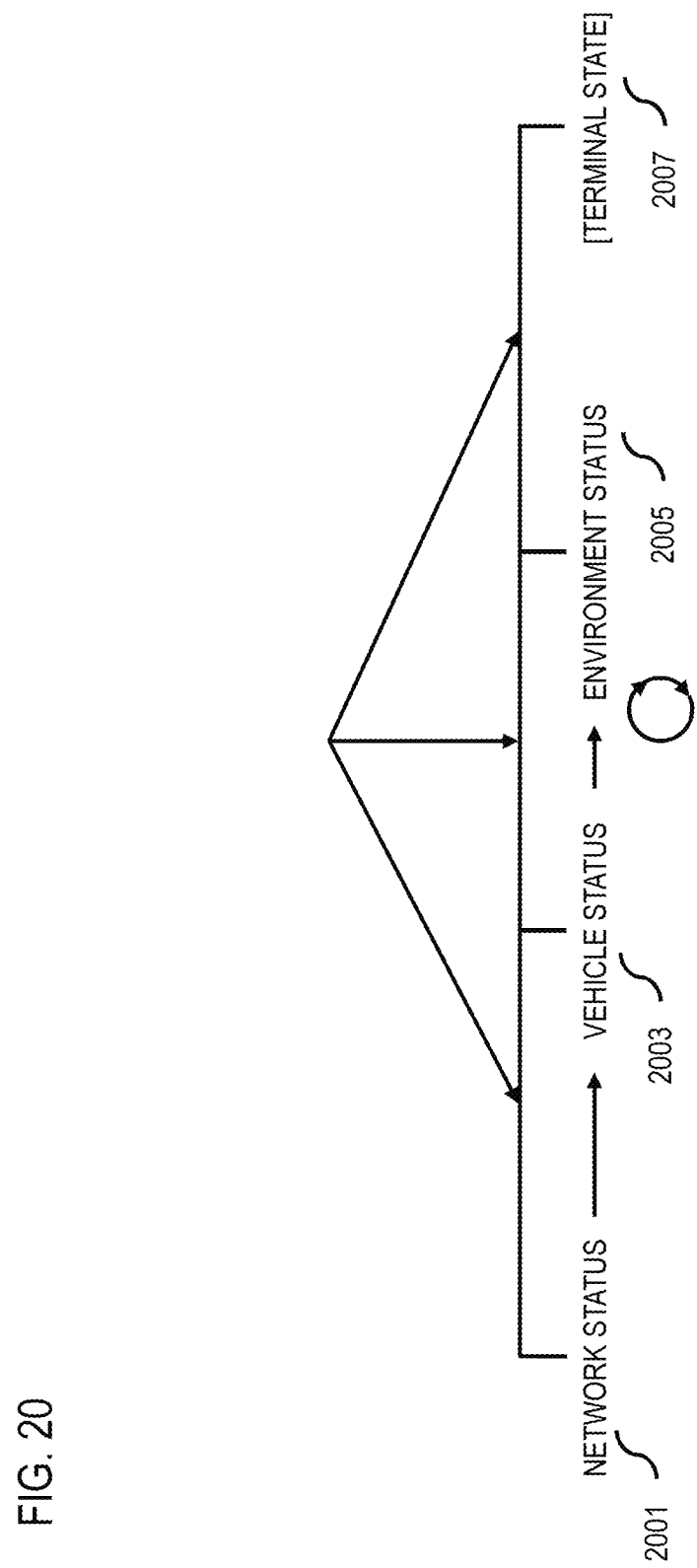
FIG. 20 is a diagram of an aerial networking resource management and control patterns recognition module, according to one example embodiment.

FIG. 20 is a diagram of an aerial networking resource management and control patterns recognition module, according to one example embodiment. FIG. 20 includes a network status [2001], a vehicle status [2003], environment status [2005], and a terminal state [2007]. In one embodiment, FIG. 20 relates to a network module example, for example, the lowest layer HHMM module in FIG. 19. It is contemplated that the aerial networking resource management and control pattern recognition module described herein may perform network status, vehicle status and environmental status machine learning. The aerial networking resource management and control patterns recognition module may utilize multi-level pattern recognition. For example, extension network machine understanding, similar to acoustical signals structured into a hierarchy of phonemes, words, phrases, and sentences utilized for natural language machine understanding. Each level may provide additional constraints, which may be exploited to increase accuracy by combining decisions probabilistically at lower levels and making more deterministic decisions at the highest level.

In one embodiment, the HHMMs in the aerial networking resource management and control identifies the likelihood of specific patterns of network, aerial vehicle and/or the environment important for managing and controlling aerial vehicle network services.

Figure 21:
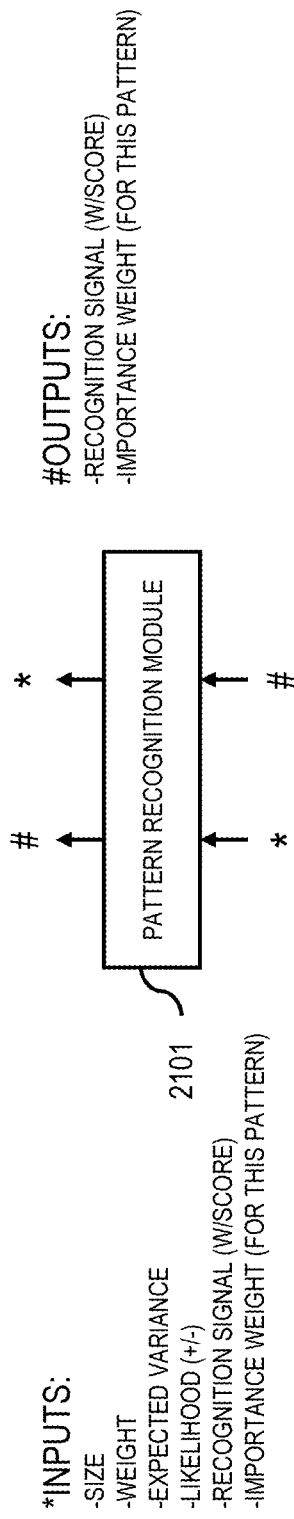
FIG. 21 is a diagram of an aerial networking resource management and control pattern recognition module, according to one example embodiment.

FIG. 21 is a diagram of an aerial networking resource management and control pattern recognition module, according to one example embodiment. Despite that the module herein is described with respect to an aerial vehicle pattern recognition module, it is contemplated that this recognition module can be used for other types of vehicles [2101].

The aerial networking resource management and control pattern recognition system comprises numerous self-organizing pattern recognition modules. These pattern recognition modules can represent any network, vehicle and/or environment patterns. The downward flow from the pattern recognition module is significant in that it predicts what will be recognized (and lower-level pattern recognition module adjust their thresholds so they are more likely/less-likely to send the Recognition Signal).

In one embodiment, the pattern recognition module inputs include size (a vector quantization such as the vector quantization value calculated on the network, vehicle and/or environment data), weight (how important this pattern is to the current recognition task), expected variance (expected variability of size), likelihood (likelihood a pattern is expected or not expected), recognition signal (signal to upper level pattern recognition modules that the pattern was recognized), importance weight (numeric value indicating how important this pattern is to the overall recognition task). As to the likelihood input, a higher-level pattern recognition module may signal a higher likelihood that something is the pattern. This pattern recognition module may reduce or increase its threshold for recognition (thus making it "easier" or "harder" to claim that the pattern was recognized).

In one embodiment, the processing may include adjusting recognition threshold based on likelihood input, calculating recognition signal, etc. The calculation of recognition signal may be a calculation of a probability that the pattern is present and may use comparison of current inputs to stored parameters including size and expected size based on expected variance, factoring importance weight of current pattern recognition inputs and factoring likeliness of inputs. In another embodiment, the outputs include recognition signal (signal to upper level pattern recognition modules that the pattern was recognized (a recognition score may be included)), importance weight (numeric value indicating how important this pattern is to the overall recognition task.

Figure 22:
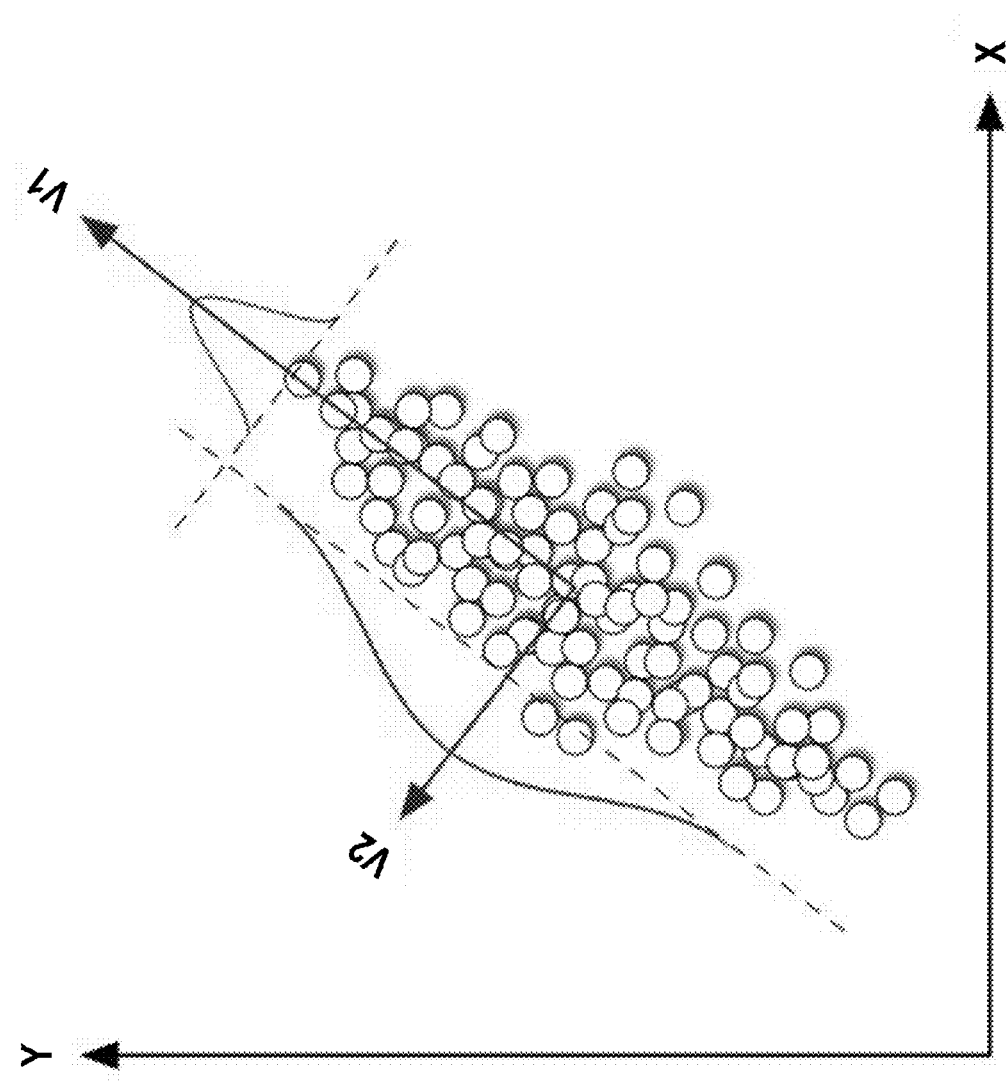
FIG. 22 is a graphical representation of a vector quantization of a network, a vehicle and/or environment data, according to one example embodiment.

FIG. 22 is a graphical representation of a vector quantization of a network, a vehicle and/or environment data, according to one example embodiment. In one embodiment, the network, vehicle and/or environment data are represented by a set of numbers based on appropriate criteria (e.g., temporal duration of a network connection, networking details of known aerial vehicles, quantized environmental information, etc.). Previous data has been "mapped" to a cluster of points, the geometric center of those points is made as small as possible and becomes the quantized representation. The number of the cluster whose center point is closest to this new value then represents newly input network data. This processing may occur in the network extension platform 115 and may be useful in the network extension efforts.

Figure 23:
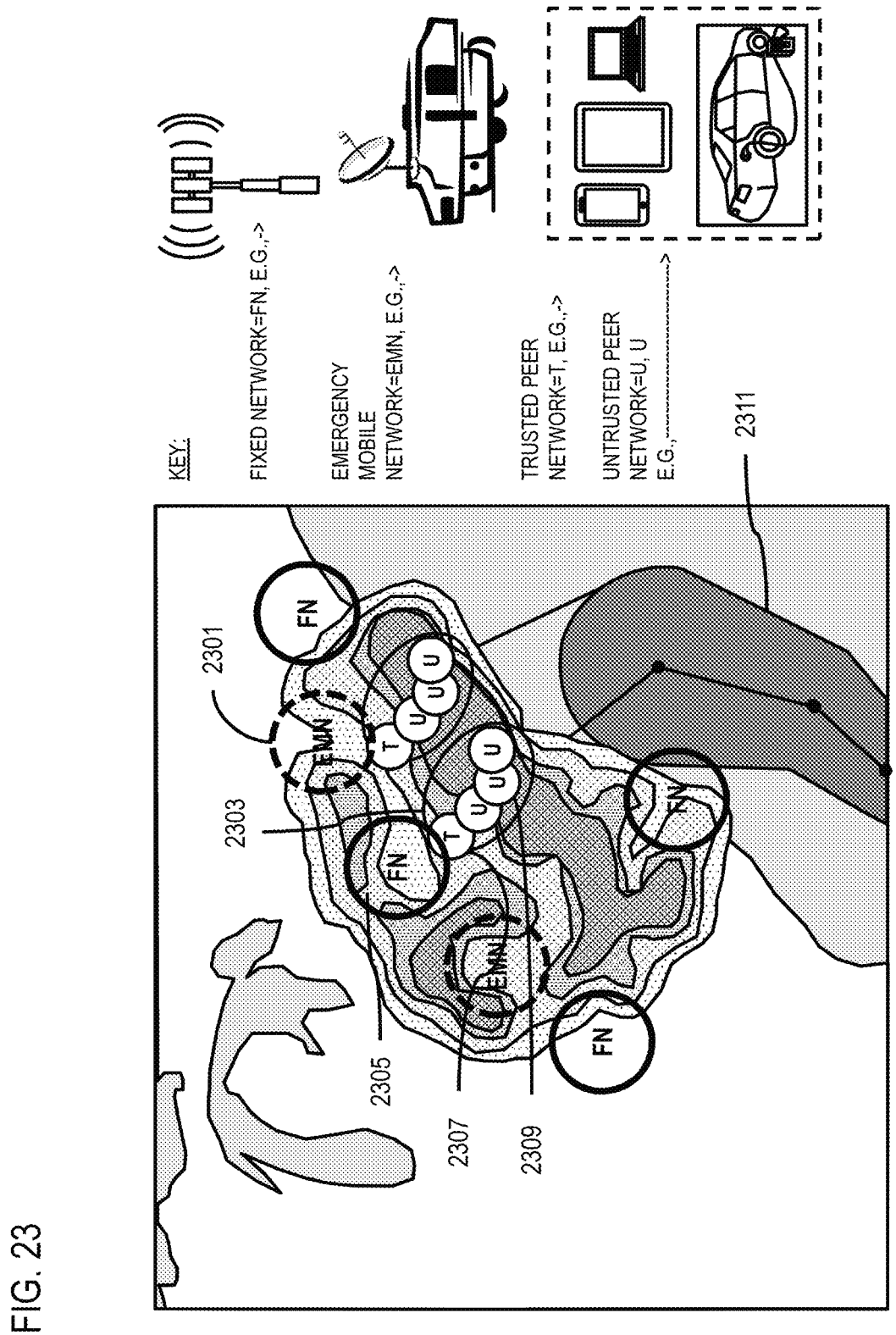
FIG. 23 is a diagram of an extension mesh network during an emergency situation, according to one example embodiment.

FIG. 23 is a diagram of an extension mesh network during an emergency situation, according to one example embodiment. FIG. 23 shows an area hit by a hurricane 2311, and the network coverage in that area is heavily disturbed. FIG. 23 also shows an emergency mobile network 2301, an extended mesh network 2303, a fixed network 2305, a trusted peer network 2307, and an untrusted peer network 2309. In one embodiment, a secured network is extended to areas hit by a natural disaster such as a hurricane, tornado, mud slide, earthquake, wildfire, flood, etc. Trusted commercial fixed and mobile emergency network resources are extended, e.g., via trusted peer networks 2307, which can be implemented by nodes such as mobile devices, connected cars, UAVs, etc.

In an emergency situation the network resources may be scarce or non-existent. In such situation, a fixed network 2305 may be an initial point of extension of a network to a trusted peer network 2307, which may be extended to subsequent untrusted peer networks 2309 forming an extended mesh network. Concurrently, an emergency mobile network [2301, 2307] may be a starting point of distribution to other areas or to the same area (in case more resources are necessary in an area that network extension has already covered). The communication signals may then be distributed to other trusted [2307] and/or untrusted [2309] peer networks forming an extended mesh network 2303. In one scenario, the extended mesh network 2303 may be comprised of trusted and untrusted nodes or points of connection, only trusted nodes or points of connection, or only untrusted nodes or points of connection.

In one scenario, an emergency mobile network 2301 may be a terrestrial mobile network, aerial vehicles, balloons, airships/dirigibles, drones, any other type of aircraft equipped to distribute network coverage. In another scenario, a fixed network may be an antenna or any other fixed network resource. In a further scenario, an extended mesh network 2303 may communicate with other mesh networks, fixed networks 2305 and trusted and untrusted peer network, etc.

Figure 24:
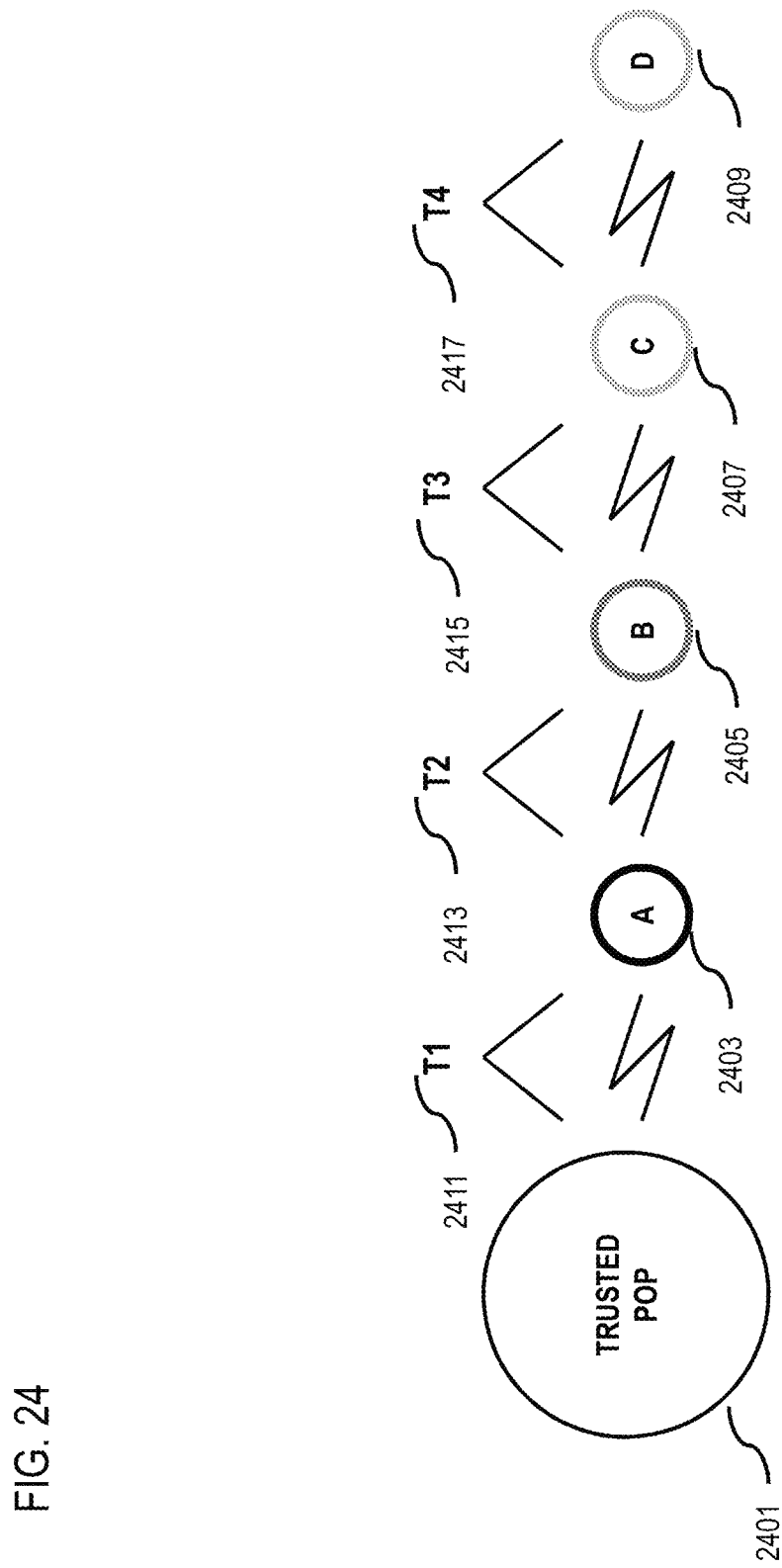
FIG. 24 is a diagram that represents a transitive trust token for network extension, according to one example embodiment.

FIG. 24 is a diagram that represents a transitive trust token for network extension, according to one example embodiment. FIG. 24 shows a trusted point of presence (PoP) [2401], node A [2403], node B [2405], node C [2407], node D [2409], and relationships T1 through T4, respectively [2411, 2413, 2415, and 2417]. In one embodiment, the trusted PoP [2401] is a token trust authority for relationship T1 between trusted PoP [2401] and node A [2403], while node A [2403] is the token trusted authority for relationship T2 [2413] with node B [2405], similarly node B [2405] is the token trusted authority for relationship T3 [2415] with node C [2407], and node C [2407] is the token trusted authority for relationship T4 [2417] with node D [2409]. In one scenario, the token trust authority is the node or point of connection with a higher trustworthiness.

In one embodiment, the trustworthiness of each node or point of connection is determined by several trust factors, such as, the number of network hops from the trusted PoP or originally trusted network, physical location of the node, network type, number of peer connections, known node, known network, communication history, any other factor that allows the network extension platform 115 to assess the trust score.

Figure 26:
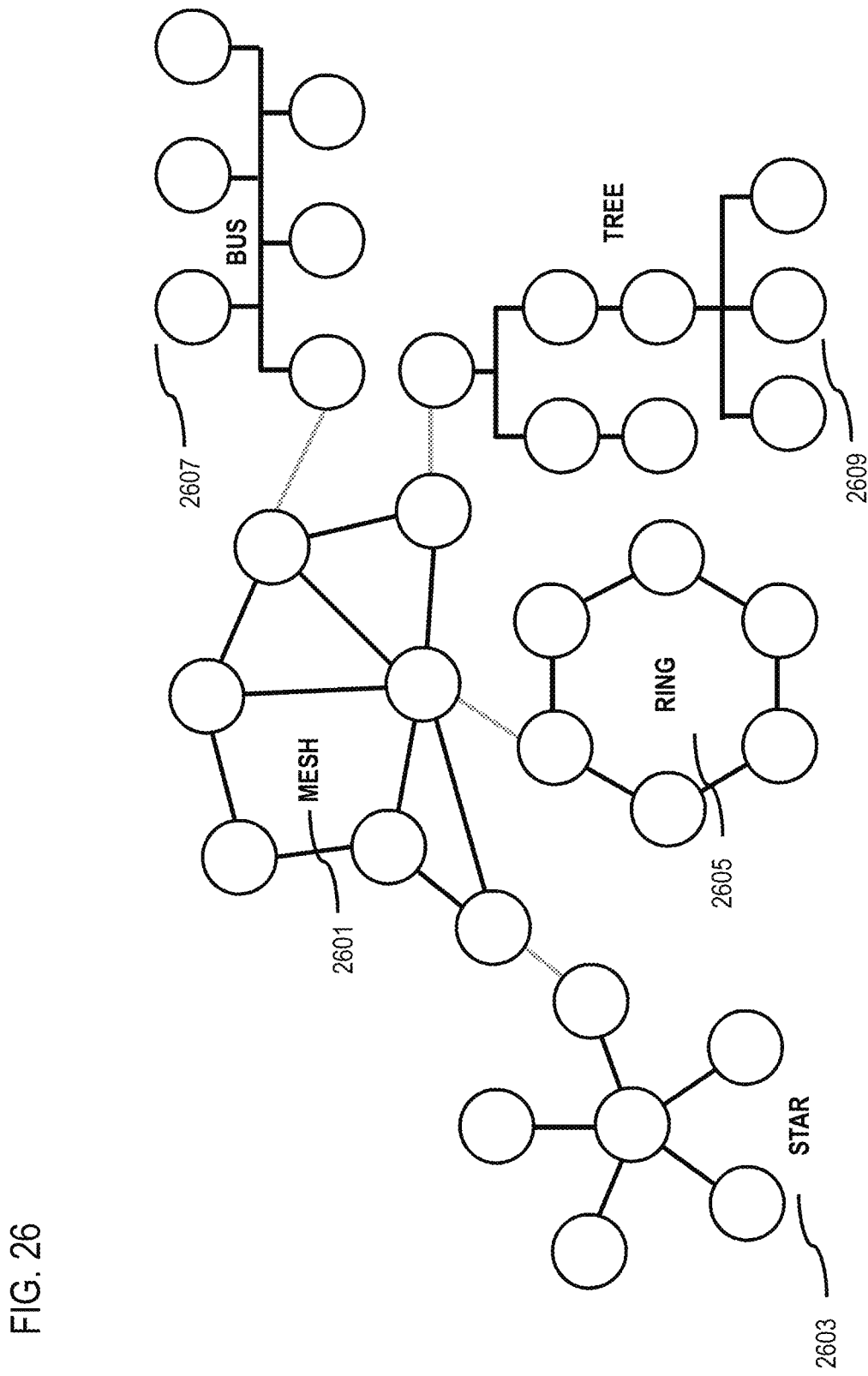
FIG. 26 is a diagram that represents several types of topology/architectures for an extended network, according to one example embodiment.

In another embodiment, the trusted PoP 2401 securely transfers trust level information to node A [2403] (e.g., in the form of a securely transferred transitive Trust Token), after which the node A [2403] becomes the token trust authority for network relationship T2 [2413] and performs the network extension trust factor calculation for network relationship T2 [2413] with node B [2405]. This network extension may continue similarly for nodes C and D (and beyond) and for different network topologies/architectures as shown in FIG. 26.

It is contemplated that the transitive relationships [2411-2417] may be represented by e.g., ">", "<", "=". Accordingly, whenever node A [2403]>node B [2405]; and node B [2405]>node C [2407], then also node A [2403]>node C [2407]. This means that node A [2403] is more trusted than node B [2405] and node C [2407]. Similarly, node B [2405] is more trusted than node C [2407]. Similarly, node C [2407] is more trusted than node D [2409]. This allows the network extension platform 115 to determine the network trustworthiness, as opposed to determine only the trustworthiness of the relationship between two nodes. For example, if node A [2403] is highly trusted, the transitive trust token to be conveyed may also have a high trust level. If node B [2405] is indicated as mid-level trust node, even if node C [2407] is highly trusted, the relationship T3 [2415] may not be highly trustworthy because of the trust level of node B [2405], and all subsequent relationships may not have a trust level that is higher than the trust level of node B [2405] and or relationship T2 [2413]. In another embodiment, if another node with a higher trust level than node B [2405] is sensed by the network extension platform 115, the new node may substitute node B [2405], and allow a higher trust level of the network or communication path. In this case, if node C [2407] and node D [2409] are found to have a high trust level, the score level of the whole network will be higher as compared to the trust level of the network with the original node B [2405].

Figure 25:
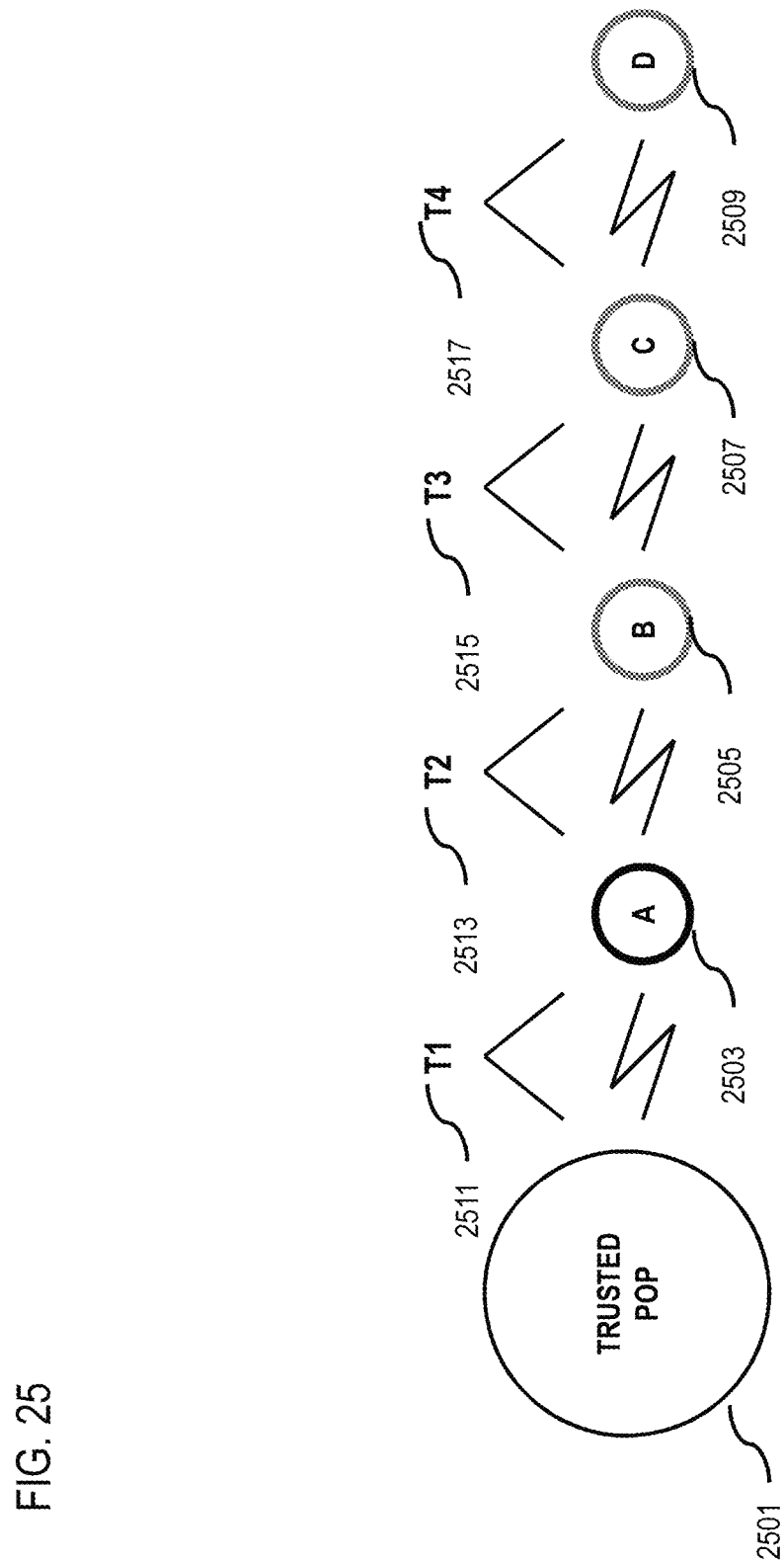
FIG. 25 is a diagram that represents a transitive trust token for network extension with different trust levels, according to one example embodiment.

FIG. 25 is a diagram that represents a transitive trust token for network extension with different trust levels, according to one example embodiment. In one scenario, FIG. 25 may generate transitive trust token, transmit the transitive trust token, and influence the trustworthiness of the network, for example, determining factors that influence the trustworthiness of the nodes [2503-2509]. It is contemplated that the trusted network extension methods herein described may be applied to different network topologies/architectures.

FIG. 25 shows a trusted PoP [2501], node A [2503], node B [2505], node C [2507], node D [2509], and relationship T1 through T4, respectively [2511, 2513, 2515, 2517]. In this example, since nodes C [2507] and D [2509] have a medium level of trustworthiness, as opposed to a situation where nodes C [2507] and D [2509] were untrusted, the trust score of the whole network or communication path also changes to a medium level.

In one scenario, if node A [2503] is untrusted, then even if nodes B-D [2505-2509] are highly trusted, the network trust score will not be high. In fact the score of the network may be lower than if all the nodes had a mid-level trust score. In another scenario, nodes with mid-level trust scores, such as, B [2505], C [2507] and D [2509] may be a wireless-identifiable mobile devices serviced by the carrier that utilizes known networks (e.g., Wi-Fi networks previously sensed and fingerprinted). This may also affect the cumulative trust level (i.e., trust of network and trust of node), and may warrant a higher level of trust for network relationships T2 [2513], T3 [2515] and T4 [2517]. Therefore, when a mobile device user is serviced by the same carrier that allows his/her participation in an extension process, this might result in a higher trust classification as part of the network extension process.

In one embodiment, the trust for one or more networks may be represented in various forms. In one scenario, token examples may include green nodes (high trust), yellow nodes (medium trust), and red nodes (low trust). In another scenario, a trust score may be represented as a decimal number from 0 to 1, trust scores such as score <0.2 (no trust), 0.2<=score <0.4 (low trust), 0.4<=score <0.8 (medium trust), and score >=0.8 (high trust).

FIG. 26 is a diagram that represents several types of topology/architecture for an extended network, according to one example embodiment. FIG. 26 includes a mesh architecture/topology [2601], a star architecture/topology [2603], a ring architecture/topology [2605], a bus architecture/topology [2607], and a tree architecture/topology [2609]. Despite different types of topology/architecture are shown as being connected, it is envisioned that network trust and node trust may be calculated and used separately. These scenarios may be based on the identification of context by the network extension platform 115.

In one embodiment, these different topology/architecture either applied separately or combined may allow for a more secure network as it provides a wider range of possible paths that a communication signal may take to reach the end point. Accordingly, if a node or point of connection does not have a high trust score, the network extension platform 115 may direct the traffic of the communication away from the low trust node or point of connection to nodes or points of connections with higher trust scores.

In one scenario, the network extension platform 115 may determine a context, and may select the nodes or points of connection for network coverage extension based, at least in part, on the context. In another scenario, a user may choose to allow participation in an extension network of a certain trust level (e.g., at least "medium" trust) and/or for a specified type of network traffic or service (e.g., emergency communications only). Accordingly, it is important that the network extension platform 115 is capable of establishing several different types of topology/architecture in order to be able to form these networks and communication paths with determined trust levels in order to be able to include a UE 101 into the extended network process, or, in the alternative, to be able to form an extended network and path without having to depend on a certain user or UE 101.

Figure 27:
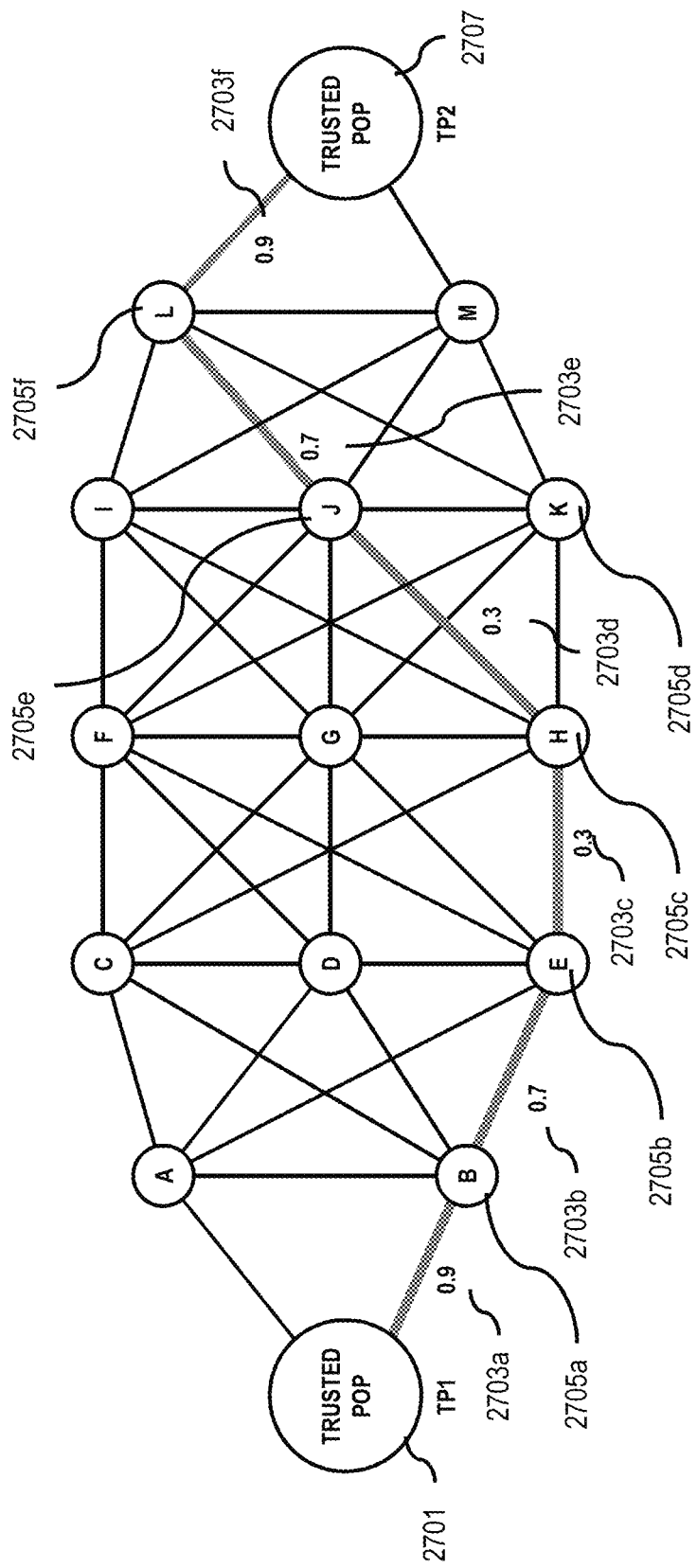
FIG. 27 is a diagram that represents a network extension utilizing trust tokens, according to one example embodiment.

FIG. 27 is a diagram that represents a network extension token trust, according to one example embodiment. FIG. 27 includes trusted PoP [2701], trust scores [2703a-2703f], nodes [2705a-2705f], and end point trusted PoP [2707].

In one embodiment, the trust score of a communication path between nodes is determined by the lowest trust score of the hops made to establish the end-to-end path. It is contemplated that the trust score below 0.2 may be considered no trust, scores between 0.2 and 0.4 may be considered low trust, scores between 0.4 and 0.8 may be classified as medium trust, and score above 0.8 may be classified as high trust.

In FIG. 27, the gray line indicates the communication signal path. The trust score 0.9 [2703a] indicates that the relationship between trusted PoP [2701] and node B [2705a] has a high trust score, while relationship between node E [2705b] and node H [2705c] has a low trust score [2703c] of 0.3. Since the lowest trust score of the communication path is 0.3 [2703c, 2703d], the communication signal path has a trust score of 0.3. Therefore, the lowest trust score may define the communication path score. It is contemplated that other metrics may be used in order to determine the trust score of a communication path. Once the trust score of a communication path is determined by the network extension platform 115, the platform may sense and classify other nodes, and redirect the communication course through a sensed and classified node or point of connection with a higher trust score.

Figure 28:
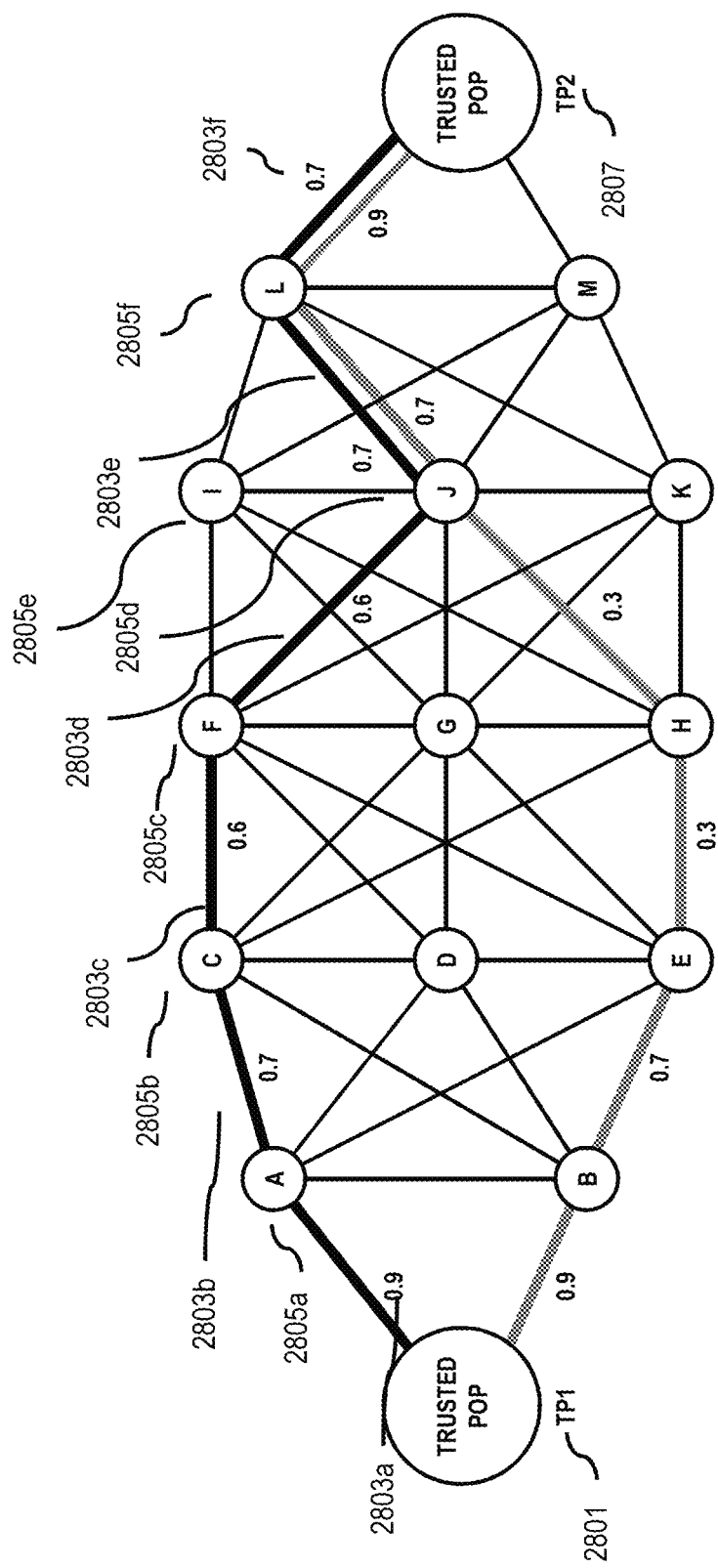
FIG. 28 is a diagram that represents a reclassification of the network trust score, according to one example embodiment.

FIG. 28 is a diagram that represents a reclassification of the network trust score, according to one example embodiment. FIG. 28 includes trusted PoP [2801], trust scores [2803a-2803f], nodes [2805a-2805f], and end point trusted PoP [2807]. In one scenario, the network extension platform 115 may be able to redirect network communication traffic to the communication path with higher trust score.

In this example, the gray communication path with a trust score of 0.3 is substituted by communication path with higher scores represented by a black line. The trust score of the relationship between node C [2805b] and node F [2805c] is 0.6, which is similar to the trust score of the relationship between node F [2805c] and node J [2805d]. Since the lowest trust score for the communication path is 0.6, the communication path trust score is also 0.6.

By avoiding nodes E [2705b], H [2705c], and J [2705e], which has relationship score of 0.3 [2703c, 2703d], the network extension platform 115 may select a communication path with a higher trust score. Because the lowest score in communication path represented by the black line is 0.6, as opposed to the score of 0.3 of the communication path represented by the gray line, the network extension platform 115 may select the communication path with a score of 0.6. Therefore, if the trust scale indicates that a trust score below 0.2 is considered "no trust", scores between 0.2 and 0.4 is considered "low trust", scores between 0.4 and 0.8 is classified as "medium trust", and score above 0.8 is classified as "high trust", the network extension platform 115 was able to increase the trust score of the communication path from "low trust" to "medium trust".

Figure 29:
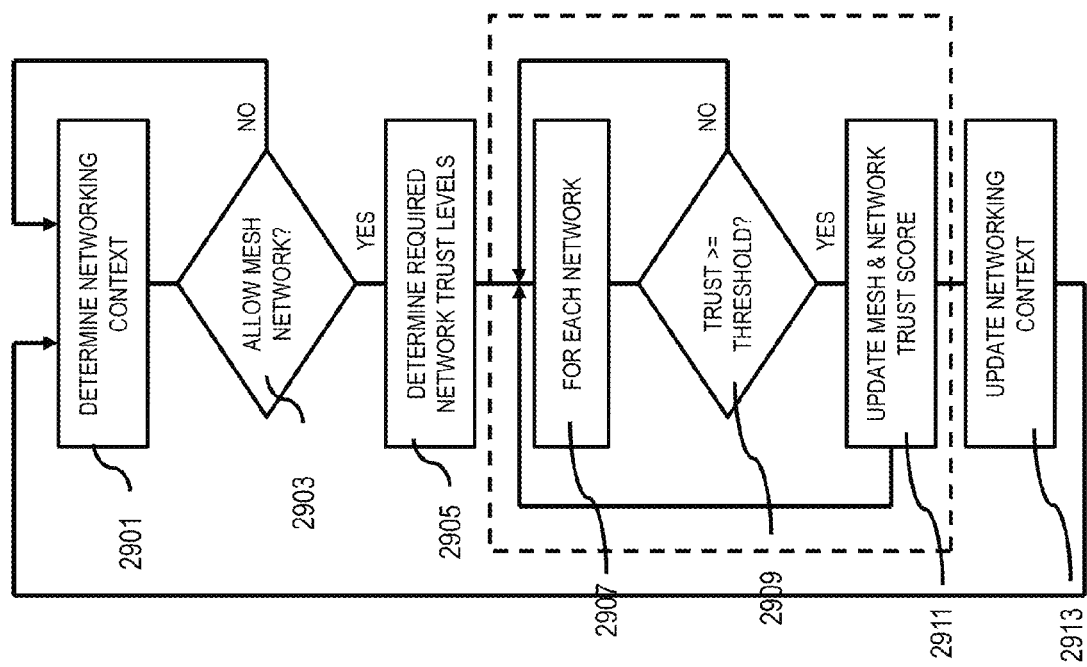
FIG. 29 is a flowchart of a context and trust-based extension mesh network approval, according to one example embodiment.

FIG. 29 is a flowchart of a context and trust-based extension mesh network approval, according to one example embodiment. In step 2901, the network extension platform 115 determines the networking context. The networking context may be an emergency situation, network disruption, network failure, etc. This may trigger the network extension platform 115 to consider extension of the network coverage via extension mesh network [2903]. In one scenario, if the extension mesh network is not allowed, the network extension platform 115 may continuously monitor the network to determine the network context [2903].

In step 2905, the network extension platform 115 may determine the network trust levels for participating in certain types of communication. For example a highly confidential communication may require a high trust level, e.g., LTE network standard requires high trust level, a Wi-Fi network standard requires medium trust level, Bluetooth network standard requires low trust level.

In step 2907, a trust level for each network may be determined. While in step 2905 the requirement of a network is determined, in step 2907 the network extension platform 115 checks whether the networks or communication paths meet the requirements. In step 2909, the network extension platform 115 may determine whether the trust level that is required for certain types of communication is equal to, or higher than the trust level of the nodes or point of connection, communication paths, or networks. In step 2909, the network extension platform 115 may match the context, with the requirements (e.g., of a context), and the nodes or points of connection, communication paths, or networks. This allows the network extension platform 115 to select an available node or point of connection, a communication path, or a network. If the trust level that is required for certain types of communication is not equal to, or higher than the trust level of the network, the network extension platform 115 may seek a communication path that meets the threshold requirement of the communication by determining the trust level for each network and communication path.

On the other hand, if the communication path or network meets the communication requirements, the network or communication path trust score may be updated in step 2911. An update of a node or of a path score may change the trust score for each network. This allows the network extension platform 115 to confirm the trust score of each network or mesh network. The update may be even more important when new communication path or networks are added. Accordingly, when a node or a path is updated, each network trust score may be updated [2911]. Once a mesh and network trust score is updated, the network or networking context may be updated as well [2913]. For example, an update may indicate that the emergency, network disruption, network failure, or any combination thereof has been remedied. After the update in step 2913, the network extension platform 115 may continue determining the networking context, a network disruption, a network failure, or any combination thereof.

Figure 30:
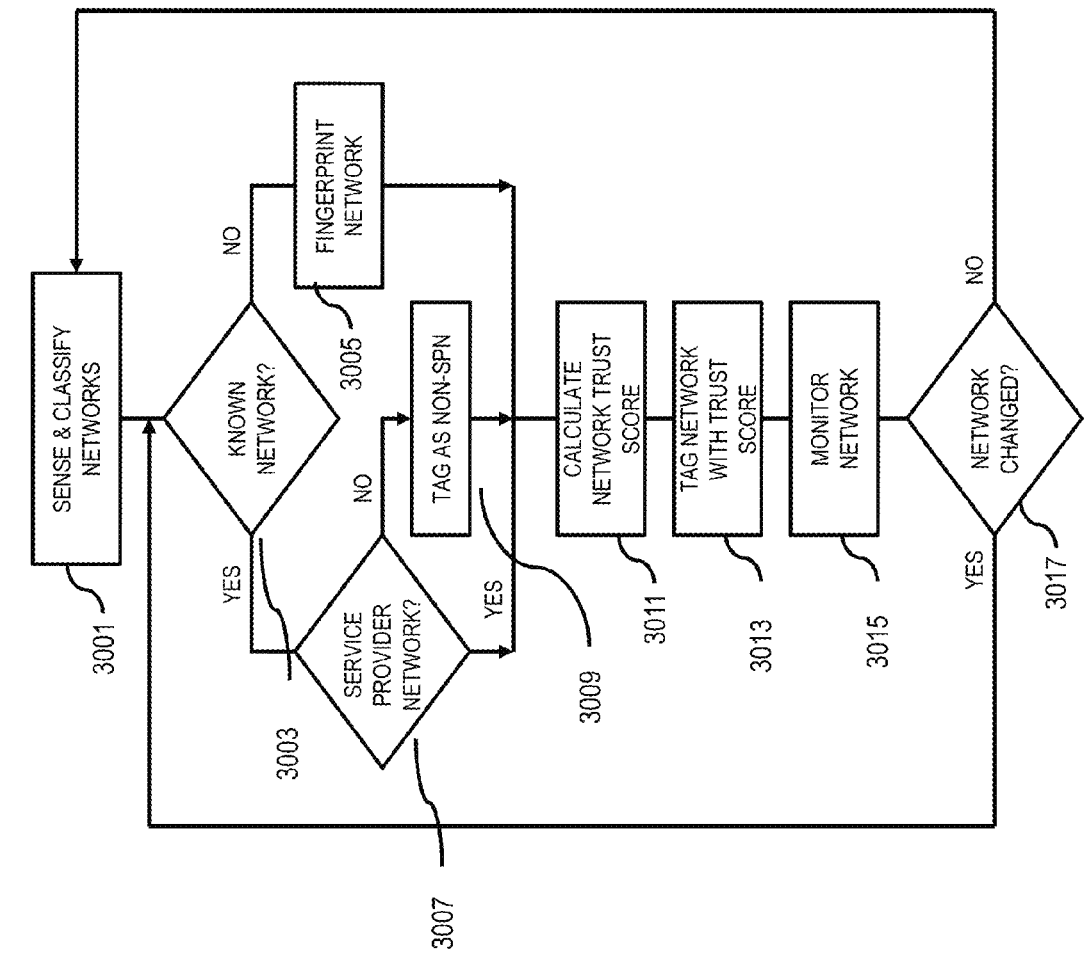
FIG. 30 is a flowchart of network sensing, and trust classification and tagging, according to one example embodiment.

FIG. 30 is a flowchart of a network sensing, and trust classification and tagging, according to one example embodiment. FIG. 30 shows a process for dynamically sensing, classifying, tagging and updating the extension network trust scores. In one embodiment, a similar flow may be used to sense, classify, tag and update device/node trust scores.

In step 3001, the network extension platform 115 may sense and classify networks for causing network extension. In step 3003, the network extension platform 115 may assess whether a sensed network is a known network, for example, a network that previously participated in a network coverage extension. In one scenario, by checking the participation history for a network the network extension platform 115 may update the network trust factor. In another scenario, the network extension participation history is a factor for determining the network trust score.

In one scenario, if a network is not a known network, the network extension platform 115 may fingerprint the network [3005]. On the other hand, if the network is a known network, the network extension platform 115 may assess whether the network is a service provider network [3007]. This allows the network extension platform 115 to determine whether a network is a more trusted network (e.g., a service provider network). If the network is not a service provider network the network extension platform 115 may tag the network as a non-service provider network [3009].

After tagging a network as a service provider network or as a non-service provider network, the network extension platform 115 may calculate the network trust score [3011]. The network extension platform 115 may consider other factors during the calculation, such as, the number of network hops from the trusted pop, physical location of the node, network standard (e.g., Wi-Fi, LTE, Bluetooth), number of peer connections, etc.

In step 3013, the network extension platform 115 may tag the network with a trust score so that communication that requires high security can be directed to paths and nodes with a higher trusted score, while communication that do not require high trust score may be transmitted through paths or nodes with a lower trust score.

The network extension platform 115 may monitor the network [3015]. The network extension platform 115 may be monitoring, for example, for any factor that changes the trust score of the nodes of the network, the relationship between nodes, or the network.

In step 3017, the network extension platform 115 may assess whether the network or communication path has changed. If the network or communication path has not changed, the network extension platform 115 may initiate step 3001 to sense and classify other networks. On the other hand, if the network or communication path changed, then process starts from determining whether the network or path is a known network or communication path.

Figure 31:
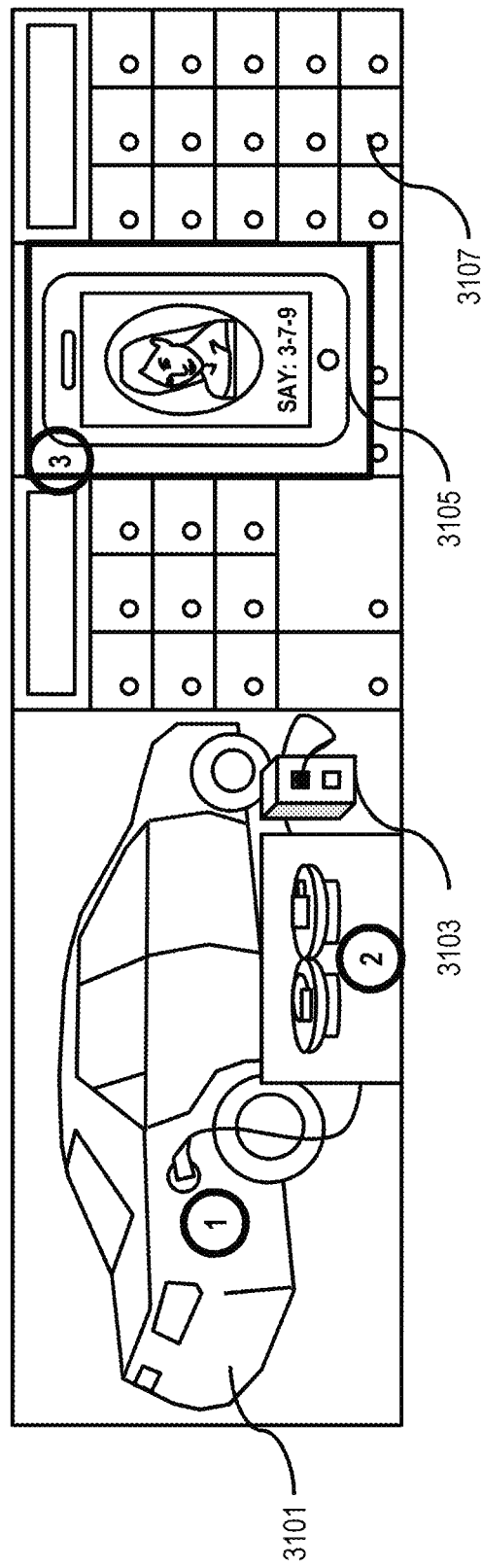
FIG. 31 is a diagram that represents a device power charging remuneration, according to one example embodiment.

FIG. 31 is a diagram that represents a device power charging remuneration, according to one example embodiment. In one scenario, subscribers that choose to participate in the network extension process may be given rewards for participating. Flexible remuneration for power charging may be used to reward subscribers. For example, if a subscriber is participating in a trusted network extension, the charging can be made available free via charging stations. Additionally, the service provider or carrier may deploy mobile charging stations in certain situations where service provider subscriber's UE 101 can be charged using charging credits based, at least in part, on usage or plans or amount that is spent. A non-subscriber could be charged a higher rate. In one example embodiment, FIG. 31 shows a car capable of generating electricity [3101], a mobile device charging station [3103], a mobile device [3105], and a mobile charging station locker [3107]. The car 3101 may be owned by a subscriber that authorized his/her participation in the network coverage extension process. The mobile device charging station [3103] may be any station capable of charging a mobile device. The mobile device [3105] may be any UE 101. The mobile charging station locker [3107] may charge any UE 101 for free (or for a fee) for subscribers.

The processes described herein for securely extending network coverage may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 32:
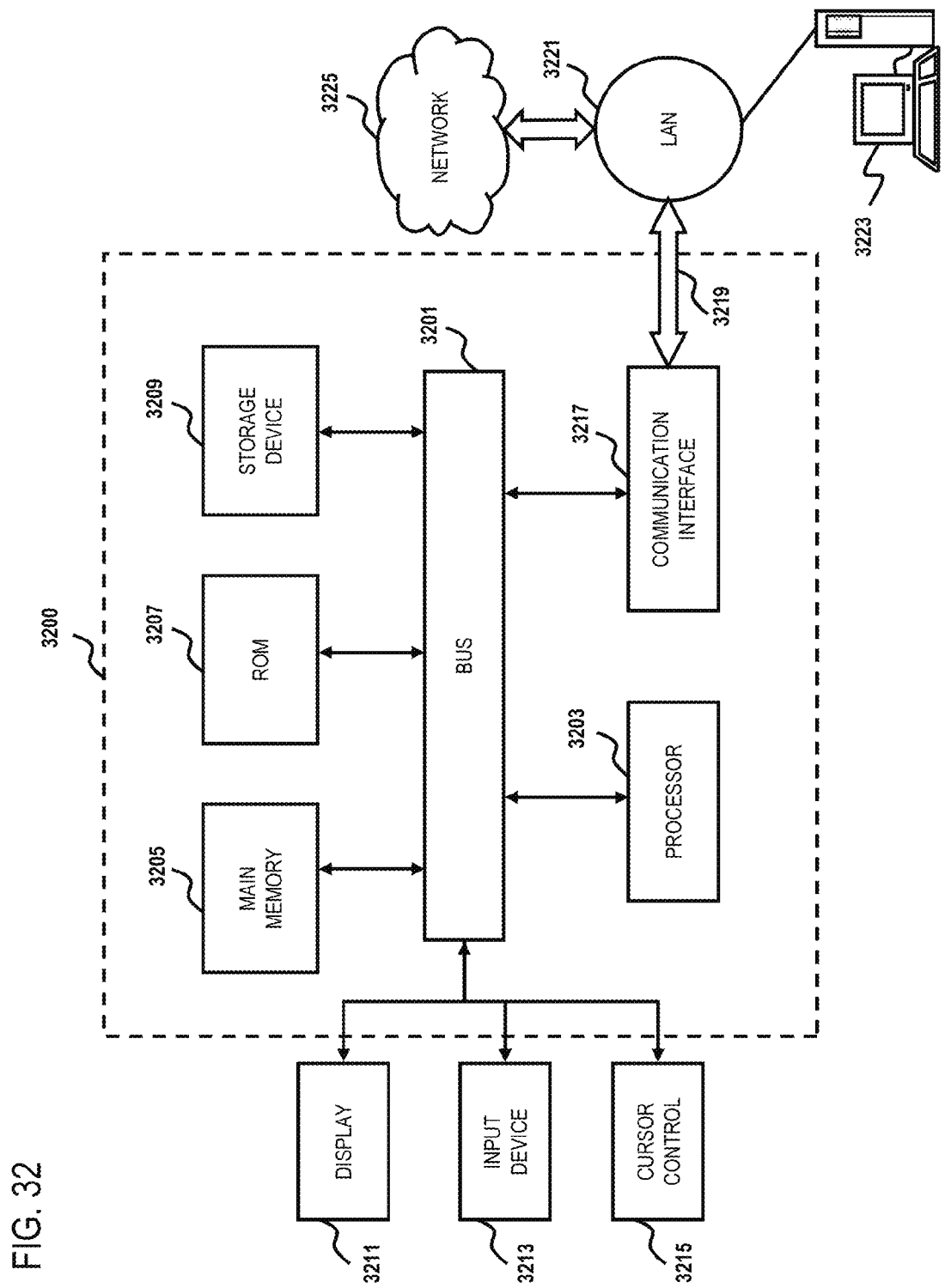
FIG. 32 is a diagram of a computer system that can be used to implement various exemplary embodiments.

FIG. 32 is a diagram of a computer system that can be used to implement various exemplary embodiments. The computer system 3200 may be coupled via the bus 3201 to a display 3211, such as a cathode ray tube (CRT), liquid crystal display, active matrix display, LED display, or plasma display, for displaying information to a computer user. An input device 3213, such as a keyboard including alphanumeric and other keys, is coupled to the bus 3201 for communicating information and command selections to the processor 3203. Another type of user input device is a cursor control 3215, such as a mouse, a trackball, gesture detection, or cursor direction keys, for communicating direction information and command selections to the processor 3203 and for controlling cursor movement on the display 3211.

According to an embodiment of the invention, the processes described herein are performed by the computer system 3200, in response to the processor 3203 executing an arrangement of instructions contained in main memory 3205. Such instructions can be read into main memory 3205 from another computer-readable medium, such as the storage device 3209. Execution of the arrangement of instructions contained in main memory 3205 causes the processor 3203 to perform the process steps described herein. One or more processors in a multi-processing arrangement may also be employed to execute the instructions contained in main memory 3205. In alternative embodiments, hard-wired circuitry may be used in place of or in combination with software instructions to implement the embodiment of the invention. Thus, embodiments of the invention are not limited to any specific combination of hardware circuitry and software. The computer system 3200 may further include a Read Only Memory (ROM) 3207 or other static storage devices coupled to the bus 3201 for storing static information and instructions for the processor 3203.

The computer system 3200 also includes a communication interface 3217 coupled to bus 3201. The communication interface 3217 provides a two-way data communication coupling to a network link 3219 connected to a local network 3221. For example, the communication interface 3217 may be a digital subscriber line (DSL) card or modem, an integrated services digital network (ISDN) card, a cable modem, a telephone modem, or any other communication interface to provide a data communication connection to a corresponding type of communication line. As another example, communication interface 3217 may be a local area network (LAN) card (e.g., for Ethernet™ or an Asynchronous Transfer Model (ATM) network) to provide a data communication connection to a compatible LAN. Wireless links can also be implemented. In any such implementation, communication interface 3217 sends and receives electrical, electromagnetic, or optical signals that carry digital data streams representing various types of information. Further, the communication interface 3217 can include peripheral interface devices, such as a Universal Serial Bus (USB) interface, a PCMCIA (Personal Computer Memory Card International Association) interface, etc. Although a single communication interface 3217 is depicted in FIG. 32, multiple communication interfaces can also be employed.

The network link 3219 typically provides data communication through one or more networks to other data devices. For example, the network link 3219 may provide a connection through local network 3221 to a host computer 3223, which has connectivity to a network 3225 (e.g., a wide area network (WAN) or the global packet data communication network now commonly referred to as the "Internet") or to data equipment operated by a service provider. The local network 3221 and the network 3225 both use electrical, electromagnetic, or optical signals to convey information and instructions. The signals through the various networks and the signals on the network link 3219 and through the communication interface 3217, which communicate digital data with the computer system 3200, are exemplary forms of carrier waves bearing the information and instructions.

The computer system 3200 can send messages and receive data, including program code, through the network(s), the network link 3219, and the communication interface 3217. In the Internet example, a server (not shown) might transmit requested code belonging to an application program for implementing an embodiment of the invention through the network 3225, the local network 3221 and the communication interface 3217. The processor 3203 may execute the transmitted code while being received and/or store the code in the storage device 3209, or other non-volatile storage for later execution. In this manner, the computer system 3200 may obtain application code in the form of a carrier wave.

The term "computer-readable medium" as used herein refers to any medium that participates in providing instructions to the processor 3203 for execution. Such a medium may take many forms, including but not limited to non-volatile media, volatile media, and transmission media. Non-volatile media include, for example, optical or magnetic disks, such as the storage device 3209. Volatile media include dynamic memory, such as main memory 3205. Transmission media include coaxial cables, copper wire and fiber optics, including the wires that comprise the bus 3201. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 33 illustrates a chip set 3300 upon which an embodiment of the invention may be implemented. Chip set 3300 is programmed to securely extend network coverage as described herein and includes, for instance, the processor and memory components described with respect to FIG. 33 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 3300, or a portion thereof, constitutes a means for performing one or more steps of FIGS. [6-10, 29-30].

In one embodiment, the chip set 3300 includes a communication mechanism such as a bus 3301 for passing information among the components of the chip set 3300. A processor 3303 has connectivity to the bus 3301 to execute instructions and process information stored in, for example, a memory 3305. The processor 3303 may include one or more processing cores with each core configured to perform independently. A multi-core processor enables multiprocessing within a single physical package. Examples of a multi-core processor include two, four, eight, or greater numbers of processing cores. Alternatively or in addition, the processor 3303 may include one or more microprocessors configured in tandem via the bus 3301 to enable independent execution of instructions, pipelining, and multithreading. The processor 3303 may also be accompanied with one or more specialized components to perform certain processing functions and tasks such as one or more digital signal processors (DSP) 3307, or one or more application-specific integrated circuits (ASIC) 3309. A DSP 3307 typically is configured to process real-world signals (e.g., sound) in real time independently of the processor 3303. Similarly, an ASIC 3309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 3303 and accompanying components have connectivity to the memory 3305 via the bus 3301. The memory 3305 includes both dynamic memory (e.g., RAM, magnetic disk, writable optical disk, etc.) and static memory (e.g., ROM, CD-ROM, etc.) for storing executable instructions that when executed perform the inventive steps described herein to securely extend network coverage. The memory 3305 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   determining a networking context, wherein the networking context initiates a request to join an extension mesh network to a currently trusted network;
   determining a target network trust level associated with the networking context, the currently trusted network, or a combination thereof;
   selecting the extension mesh network based on the target network trust level; and
   initiating a joining of the extension mesh network to the currently trusted network,
   wherein the networking context includes an emergency context.

2. A method comprising:
   determining a networking context, wherein the networking context initiates a request to join an extension mesh network to a currently trusted network;
   determining a target network trust level associated with the networking context, the currently trusted network, or a combination thereof;
   selecting the extension mesh network based on the target network trust level; and
   initiating a joining of the extension mesh network to the currently trusted network,
   wherein the extension mesh network is provided via one or more vehicles, and wherein the one or more vehicles include one or more aerial vehicles, one or more terrestrial vehicle, or a combination thereof.

3. A method of claim 2, further comprising:
   initiating a progressive triangulation to determine a location to navigate the one or more vehicles to provide the extension mesh network.

4. A method of claim 2, further comprising:
   initiating a deployment of the one or more vehicles based on a hierarchy related to networking capability information, resource availability information, mobility information, or a combination thereof associated with the one or more vehicles.

5. A method comprising:
   determining a networking context, wherein the networking context initiates a request to join an extension mesh network to a currently trusted network;
   determining a target network trust level associated with the networking context, the currently trusted network, or a combination thereof;
   selecting the extension mesh network based on the target network trust level;
   initiating a joining of the extension mesh network to the currently trusted network; and
   calculating a trust level for the extension mesh network, one or more nodes of the extension mesh network, one or more links between the one or more nodes, or a combination thereof based on one or more network trust factors,
   wherein the selecting of the extension mesh network is based on a comparison of the trust level against the target network trust level.

6. A method of claim 5, wherein the one or more network trust factors include a number of network hops from the currently trusted network, a location, a network type, a number of peer connections, whether the one or more nodes are known, whether the extension mesh network is known, a communication history, or a combination thereof.

7. A method of claim 5, further comprising:
   encoding the trust level as a trust token; and
   propagating the trust token to a token trust authority of the extension mesh network,
   wherein the token trust authority is selected from among the one or more nodes of the extension mesh network.

8. A method of claim 7, wherein the token trust authority generates another trust token for a subsequent token trust authority selected in the extension mesh network, another extension mesh network, or a combination thereof; and propagates the another trust token to the subsequent token trust authority.

9. A method of claim 8, further comprising:
   using a transitive scheme for comparing the trust level, the trust token, the another trust token, or a combination thereof among the token trust authority, the subsequent token trust authority, the one or more nodes, or a combination thereof.

10. A method of claim 7, further comprising:
    identifying at least one of the one or more nodes in a communication path traversing the extension mesh network; and
    calculating a communication path trust level for the communication path based on the trust level, the trust token, or a combination thereof associated with the at least one of the one or more nodes.

11. A method of claim 5, further comprising:
    monitoring the extension mesh network for a change to a network topology, the one or more nodes, the one or more links, or a combination thereof; and
    updating the trust level based on the change.

12. An apparatus comprising a processor configured to:
    determine a networking context, wherein the networking context initiates a request to join an extension mesh network to a currently trusted network;
    determine a target network trust level associated with the networking context, the currently trusted network, or a combination thereof;
    select the extension mesh network based on the target network trust level; and
    initiate a joining of the extension mesh network to the currently trusted network,
    wherein the extension mesh network is provided via one or more vehicles, and wherein the one or more vehicles include one or more aerial vehicles, one or more terrestrial vehicle, or a combination thereof.

13. An apparatus comprising a processor configured to:
determine a networking context, wherein the networking context initiates a request to join an extension mesh network to a currently trusted network;
determine a target network trust level associated with the networking context, the currently trusted network, or a combination thereof;
select the extension mesh network based on the target network trust level;
initiate a joining of the extension mesh network to the currently trusted network; and
calculate a trust level for the extension mesh network, one or more nodes of the extension mesh network, one or more links between the one or more nodes, or a combination thereof based on one or more network trust factors,
wherein the selecting of the extension mesh network is based on a comparison of the calculated trust level against the target network trust level.

14. An apparatus of claim 13, wherein the one or more network trust factors include a number of network hops from the currently trusted network, a location, a network type, a number of peer connections, whether the one or more nodes are known, whether the extension mesh network is known, a communication history, or a combination thereof.

15. An apparatus of claim 14, wherein the processor is further configured to:
encode the trust level as a trust token; and
propagate the trust token to a token trust authority of the extension mesh network,
wherein the token trust authority is selected from among the one or more nodes of the extension mesh network.

16. An apparatus of claim 15, wherein the token trust authority generates another trust token for a subsequent token trust authority selected in the extension mesh network, another extension mesh network, or a combination thereof; and propagates the another trust token to the subsequent token trust authority.

17. An apparatus of claim 16, wherein the processor is further configured to:
use a transitive scheme for comparing the trust level, the trust token, the another trust token, or a combination thereof among the token trust authority, the subsequent token trust authority, the one or more nodes, or a combination thereof.

18. An apparatus of claim 14, wherein the processor is further configured to:
identify at least one of the one or more nodes in a communication path traversing the extension mesh network; and
calculate a communication path trust level for the communication path based on the trust level score, the trust token, or a combination thereof associated with the at least one of the one or more nodes.

19. A method of claim 1, further comprising:
identifying at least one of the one or more nodes in a communication path traversing the extension mesh network; and
calculating a communication path trust level for the communication path based on the trust level.

20. The method of claim 2, wherein the network context includes an emergency context, and wherein the one or more vehicles are dynamically deployed to a location corresponding to the emergency.

21. The apparatus of claim 12, wherein the network context includes an emergency context, and wherein the one or more vehicles are dynamically deployed to a location corresponding to the emergency.

22. An apparatus of claim 12, wherein the processor is further configured to:
encode the trust level as a trust token; and
propagate the trust token to a token trust authority of the extension mesh network,
wherein the token trust authority is selected from among the one or more nodes of the extension mesh network.

23. An apparatus of claim 22, wherein the processor is further configured to:
use a transitive scheme for comparing the trust level, the trust token, the another trust token, or a combination thereof among the one or more nodes.

* * * * *